United States Patent [19]

Stevers et al.

[11] Patent Number: 5,501,159
[45] Date of Patent: Mar. 26, 1996

[54] METHOD OF CONTROLLING HYDROCARBON RELEASE RATE BY MAINTAINING TARGET OXYGEN CONCENTRATION IN DISCHARGE GASES

[75] Inventors: Paul H. Stevers, Kitchener, Canada; Roger D. Eshleman, Waynesboro, Pa.

[73] Assignee: Bio-Oxidation, Inc., Greencastle, Pa.

[21] Appl. No.: 283,118

[22] Filed: Jul. 29, 1994

Related U.S. Application Data

[63] Continuation-in-part of Ser. No. 987,928, Dec. 9, 1992, Pat. No. 5,353,719.
[51] Int. Cl.$^6$ .................... F23G 5/00; B09B 3/00
[52] U.S. Cl. .................... 110/188; 110/250; 110/235; 219/394; 373/109; 126/273 R
[58] Field of Search .................... 110/188, 250, 110/235, 234, 229; 219/394; 373/109; 126/273 R

[56] References Cited

U.S. PATENT DOCUMENTS

| | | | |
|---|---|---|---|
| 437,009 | 9/1890 | Auchu | 110/234 |
| 2,855,494 | 10/1958 | Kuebler | 110/234 |
| 3,716,001 | 2/1973 | Potasek et al. | 110/8 A |
| 4,182,246 | 1/1980 | Lombana et al. | 110/188 |
| 4,356,778 | 11/1982 | McRee, Jr. | 110/244 |
| 4,438,705 | 3/1984 | Basic, Sr. | 110/235 |
| 4,495,873 | 1/1985 | Blankenship | 110/250 |
| 4,513,671 | 4/1985 | Eshleman | 110/101 CF |
| 4,531,464 | 7/1985 | Eshleman | 110/259 |
| 4,598,649 | 7/1986 | Eshleman | 110/211 |
| 4,635,899 | 1/1987 | Eshleman | 251/298 |
| 4,779,795 | 10/1988 | Winmill | 237/51 |
| 4,934,283 | 6/1990 | Kydd | 110/246 |
| 4,949,652 | 8/1990 | Hadley | 110/215 |
| 5,236,470 | 8/1993 | Levin | 48/210 |
| 5,353,719 | 10/1994 | Eshleman et al. | 110/188 |

*Primary Examiner*—Henry A. Bennett
*Assistant Examiner*—William C. Doerrler
*Attorney, Agent, or Firm*—Michael R. Swartz; John R. Flanagan

[57] ABSTRACT

In a hydrocarbon release rate controlling method, a first chamber is provided capable of receiving successive batches of feed materials for thermal processing having widely varying energy content, heating is produced in the first chamber to cause pyrolyzing of the feed materials into fluid materials, a second chamber is provided communicating with the first chamber and capable of receiving the fluid materials from the first chamber and communicating the fluid materials to a discharge location, heating is produced in the second chamber to cause oxidizing of the fluid materials into discharge gases reaching the discharge location, a jacketed vessel is provided defining a channel surrounding the first and second chambers containing a flow of coolant fluid through the channel, separate variable flows of primary and secondary air are respectively produced into and through the first and second chambers, the temperatures in the first and second chambers are sensed, the temperature of the coolant in the channel of the jacketed vessel is sensed, the concentration of a preselected gas in the discharge gases is sensed, and, in response to the temperatures sensed in the first and second chambers and jacketed vessel channel coolant and in response to the concentration of the preselected gas sensed in the discharge gases, the primary and secondary flows of air into the first and second chambers are controlled so as to proportion and vary the respective amounts thereof and thereby maintain the concentration of the preselected gas in the discharge gases at a preset target level corresponding with the generation of harmless discharge gases and production of carbon-free residue ash.

22 Claims, 17 Drawing Sheets

METHOD OF CONTROLLING HYDROCARBON RELEASE RATE BY MAINTAINING TARGET OXYGEN CONCENTRATION IN DISCHARGE GASES

CROSS REFERENCE TO RELATED APPLICATION

This application is a continuation-in-part of a patent application entitled "Apparatus And Method For Controlled Processing Of Materials" by Roger D. Eshleman and Paul H. Stevers, assigned Ser. No. 07/987,928 and filed Dec. 9, 1992, now U.S. Pat. No. 5,353,719.

BACKGROUND OF THE INVENTION

1. Field of the Invention

The present invention generally relates to controlled processing of materials and, more particularly, is concerned with a method of controlling hydrocarbon release rate by maintaining target oxygen concentration in discharge gases so as to thereby convert successive batches of materials of widely varying energy content into substantially harmless gases and carbon-free residue ash.

2. Description of the Prior Art

The problem of disposal of waste matter involves a material processing challenge that is becoming increasingly acute. The primary material processing methods of waste disposal have been burning in incinerators and burial in landfills. These two material processing methods have severe disadvantages. Burning of waste liberates particulate matter and fumes which contribute to pollution of the air. Burial of wastes contributes to the contamination of ground water. A third material processing method is recycling of waste. Although increasing amounts of waste are being recycled, which alleviates the problems of the two primary material processing methods, presently available recycling methods do not provide a complete solution to the waste disposal problem.

The problem of disposal of biomedical waste materials is even more acute. The term "biomedical waste materials" is used herein in a generic sense to encompass all waste generated by medical hospitals, laboratories and clinics which may contain hazardous, toxic or infectious matter whose disposal is governed by more stringent regulations than those covering other waste. It was reported in *The Wall Street Journal* in 1989 that about 13,000 tons a day of biomedical waste, as much as 20% of it infectious, is generated by around 6,800 U.S. hospitals.

Hospitals and other generators of biomedical waste materials have employed three main material processing methods of waste handling and disposal: (1) on-site incineration with only the residue transferred to landfills; (2) on-site steam autoclaving and followed by later transfer of the waste to landfills; and (3) transfer of the waste by licensed hazardous waste haulers to off-site incinerators and landfills. Of these three main material processing methods, theoretically at least, on-site disposal is the preferred one.

However, many hospital incinerators, being predominantly located in urban areas, emit pollutants at a relatively high rate which adversely affect large populations of people. In the emissions of hospital incinerators, the Environmental Protection Agency (EPA) has identified harmful substances, including metals such as arsenic, cadmium and lead; dioxins and furans; organic compounds like ethylene, acid gases and carbon monoxide; and soot, viruses, and pathogens. Emissions of these incinerators may pose a public health threat as large as that from landfills.

Conventional incinerators most commonly are designed to operate above a certain temperature, such as 1200°–1400° F., to comply with requirements of the permit laws of many states. The reason for this requirement is that conventional thinking has been that operation of incinerators at such elevated temperatures will substantially eliminate the release of most harmful substances. This may have been true where the materials being consumed by the incinerator were assumed to be fairly uniform in terms of energy content and thus burned more or less evenly. However, this is the exception and not the normal situation today, particularly in the case of biomedical waste materials which can range from wet paper towels and steel surgery tools to plastic syringes and containers of saline solution. The thermal processing of these materials by temperature control alone will ordinarily result in the inability to control the hydrocarbon release rate and the repeated emission of un-burned hydrocarbons, typically visible as periodic puffs of black smoke, which is unacceptable under most current environmental regulations.

SUMMARY OF THE INVENTION

The present invention provides a method of controlling hydrocarbon release rate in thermal processing of materials which is designed to overcome the aforementioned problems of conventional incineration. The hydrocarbon release rate is controlled in a manner which converts successive batches of materials, particularly biomedical waste materials, of widely varying energy content into substantially harmless gases and carbon-free residue ash. The residue ash is a sterile, inert inorganic powder, which is non-hazardous, non-leachable and capable of disposal as ordinary trash.

Accordingly, the present invention is directed to a method of controlling the hydrocarbon release rate in the thermal processing and conversion of materials of widely varying energy content in a batch processing cycle. The hydrocarbon release rate controlling method comprises the steps of: (a) providing a first chamber capable of receiving successive batches of feed materials for thermal processing and having widely varying energy content; (b) producing heating in the first chamber to cause pyrolyzing of the feed materials into fluid materials; (c) providing a second chamber communicating with the first chamber and capable of receiving the fluid materials from the first chamber and communicating the fluid materials to a discharge location; (d) producing heating in the second chamber to cause oxidizing of the fluid materials into discharge gases reaching the discharge location; (e) providing a jacketed vessel defining a channel surrounding the first and second chambers containing a flow of coolant fluid through the channel; (f) producing separate variable flows of primary and secondary air respectively into and through the first and second chambers; (g) sensing the temperatures in the first and second chambers; (h) sensing the temperature of the coolant in the channel of the jacketed vessel; (i) sensing the concentration of a preselected gas in the discharge gases; and (j) in response to the temperatures sensed in the first and second chambers and jacketed vessel channel coolant and in response to the concentration of the preselected gas sensed in the discharge gases, controlling primary and secondary flows of air into the first and second chambers so as to proportion and vary the respective amounts thereof and thereby maintain concentration of the preselected gas in the discharge gases at a preset target corresponding to the generation of substantially harmless discharge gases and production of substantially carbon-free residue ash. The preselected gas is preferably oxygen.

More particularly, the controlling of the primary and secondary air flows includes comparing the sensed concentration of the preselected gas to the preset target thereof, and changing the proportion of primary air flow to secondary air flow if the sensed concentration of the preselected gas is either higher or lower than the preset target thereof. The changing of the proportion of primary and secondary air flows occurs at a higher rate if the sensed concentration of the preselected gas is lower than the preset target, whereas the changing of the proportion of primary and secondary air flows occurs at a lower rate if the sensed concentration of the preselected gas is higher than the preset target.

Also, the controlling of the primary and secondary air flows includes comparing the sensed concentration of the preselected gas to the preset target thereof, and changing the speed of a fan to change the amount of primary and secondary air flows if the sensed concentration of the preselected gas is higher or lower than the preset target thereof. The changing of the speed of the fan occurs at a higher rate if the sensed concentration of the preselected gas is lower than the preset target thereof, whereas the changing of the speed of the fan occurs at a lower rate if the sensed concentration of the preselected gas is higher than the preset target thereof.

The hydrocarbon release rate controlling method also includes the step of providing a heated refractory mass having an exterior surface forming the base of the first chamber and exposed to feed materials received therein such that the feed materials in close proximity to the exterior surface are heated and oxidized by the refractory mass. In the preferred embodiment, the refractory mass is heated by an arrangement of passages defining at least a portion of the second chamber and communicating with the first chamber such that the refractory mass is surrounded by the jacketed vessel and maintained in a heated condition at an elevated temperature by the heating produced in the first chamber and by the pyrolyzing and oxidizing of materials in the respective first and second chambers. The heated condition of the refractory mass, in turn, causes heating and oxidizing of materials in close proximity to the exterior surface of the refractory mass. The hydrocarbon release rate controlling method further includes the step of initiating a slow-start sequence for a predetermined period of time after the receipt of a new batch of material into the first chamber during which the desired target level of concentration of the preselected gas is temporarily increased so that the hydrocarbon release rate is temporarily reduced for the duration of the predetermined period of time. Also, the hydrocarbon release rate controlling method includes the step of ending a batch processing cycle by diverting substantially all air flow into the first chamber to cause oxidation of any remaining feed materials in the first chamber and thereby reduce such materials to substantially carbon-free residue ash.

These and other features and advantages and attainments of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

In the course of the following detailed description, reference will be made to the attached drawings in which.

DETAILED DESCRIPTION OF THE INVENTION

Figure 1:
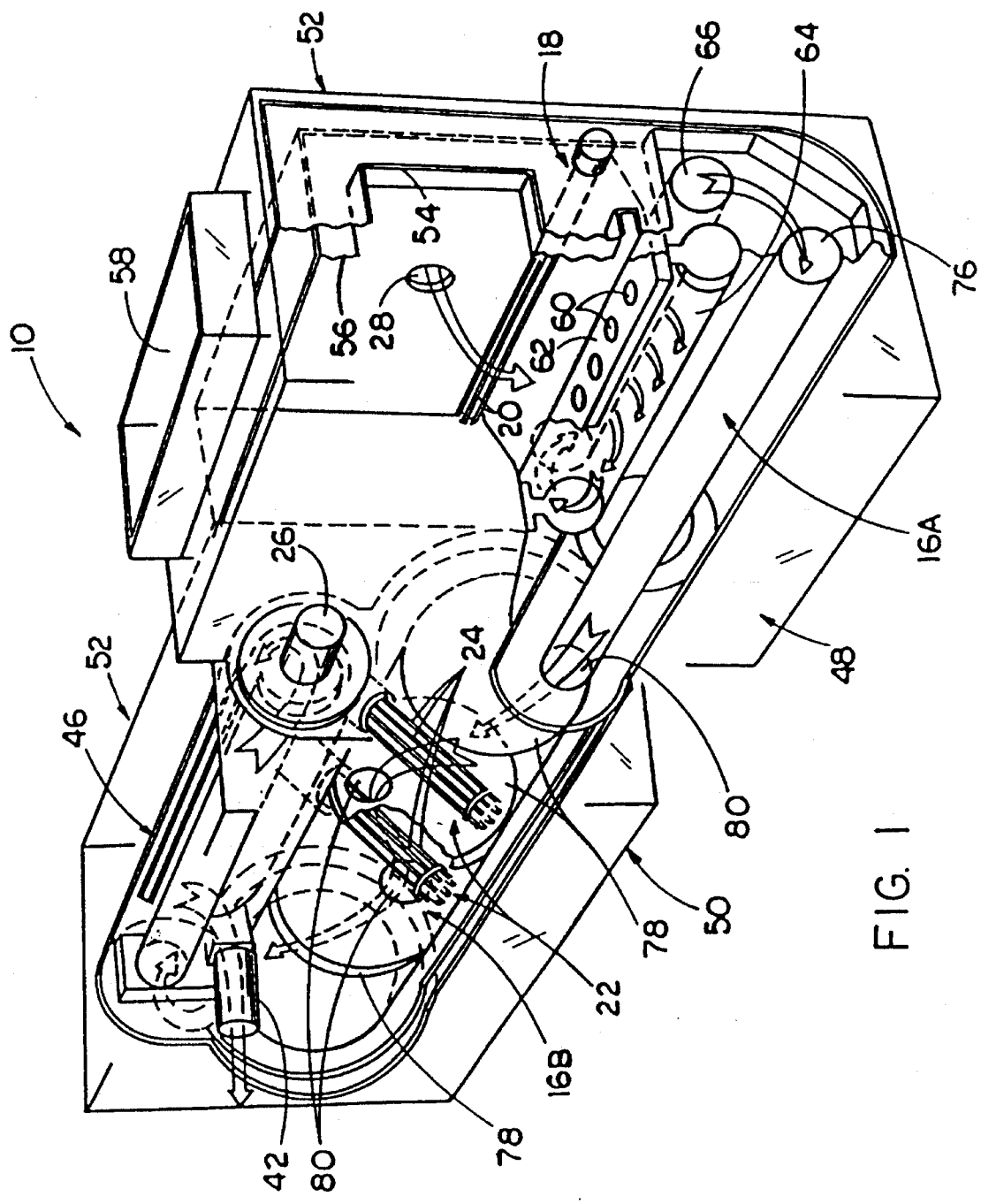
FIG. 1 is a schematical perspective view of an exemplary apparatus for controlled thermal processing of materials which is operated in accordance with the hydrocarbon release rate controlling method of the present invention.
Figure 2:
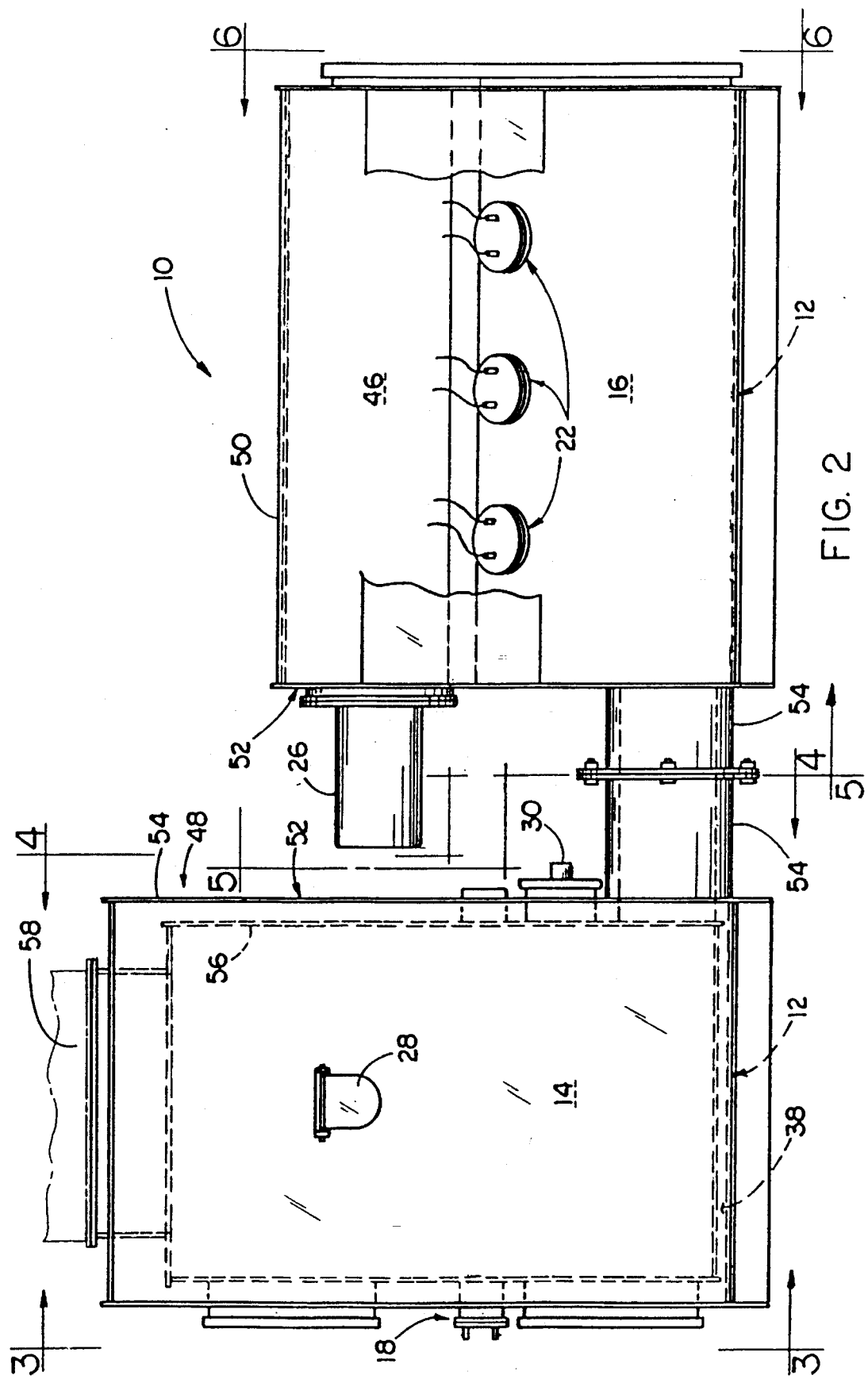
FIG. 2 is an enlarged side elevational view of the apparatus of FIG. 1, showing an opposite side from that shown in FIG. 1.
Figure 3:
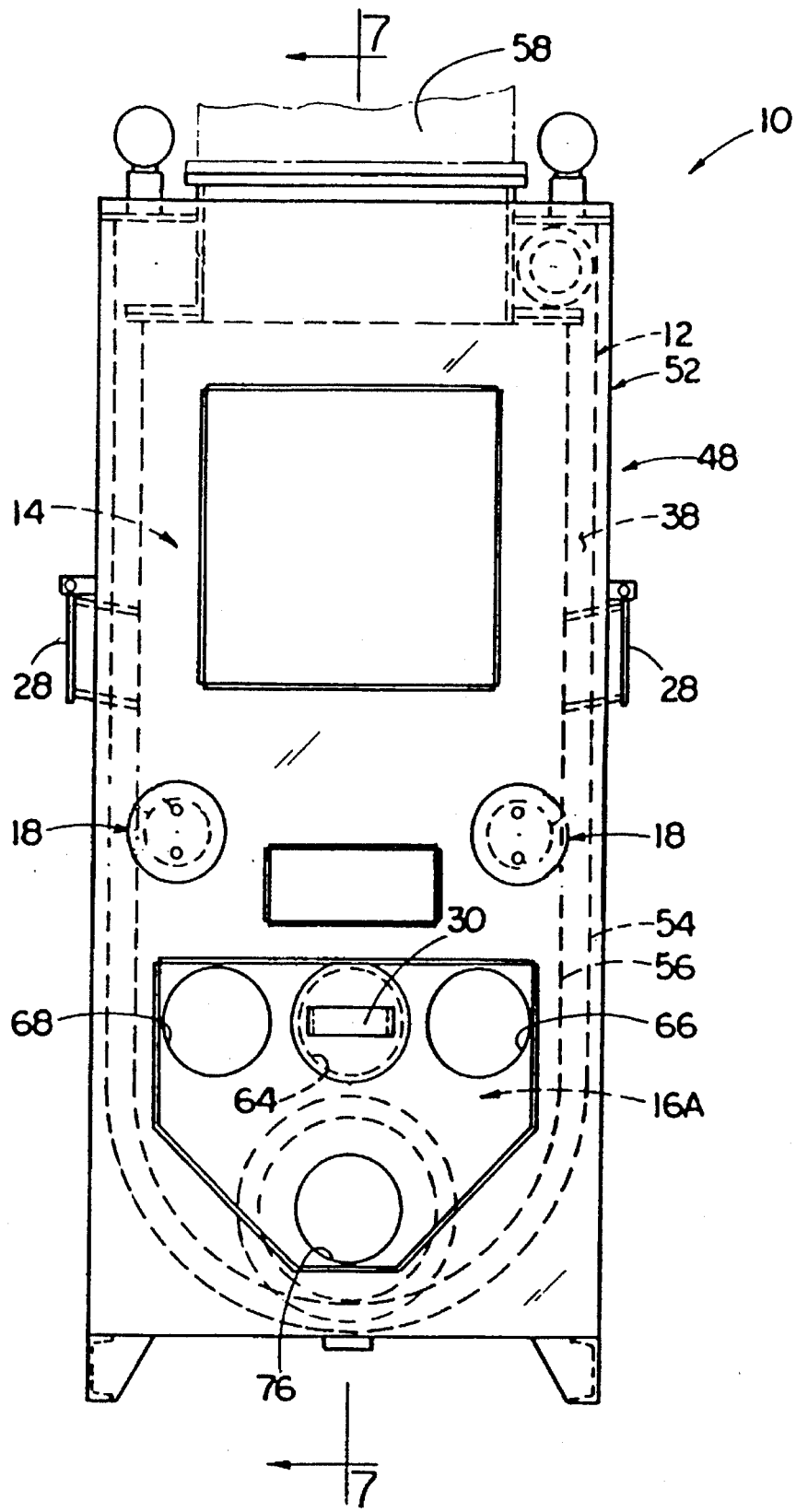
FIG. 3 is an enlarged end elevational view of a first housing unit of the apparatus as seen along line 3—3 of FIG. 2.
Figure 4:
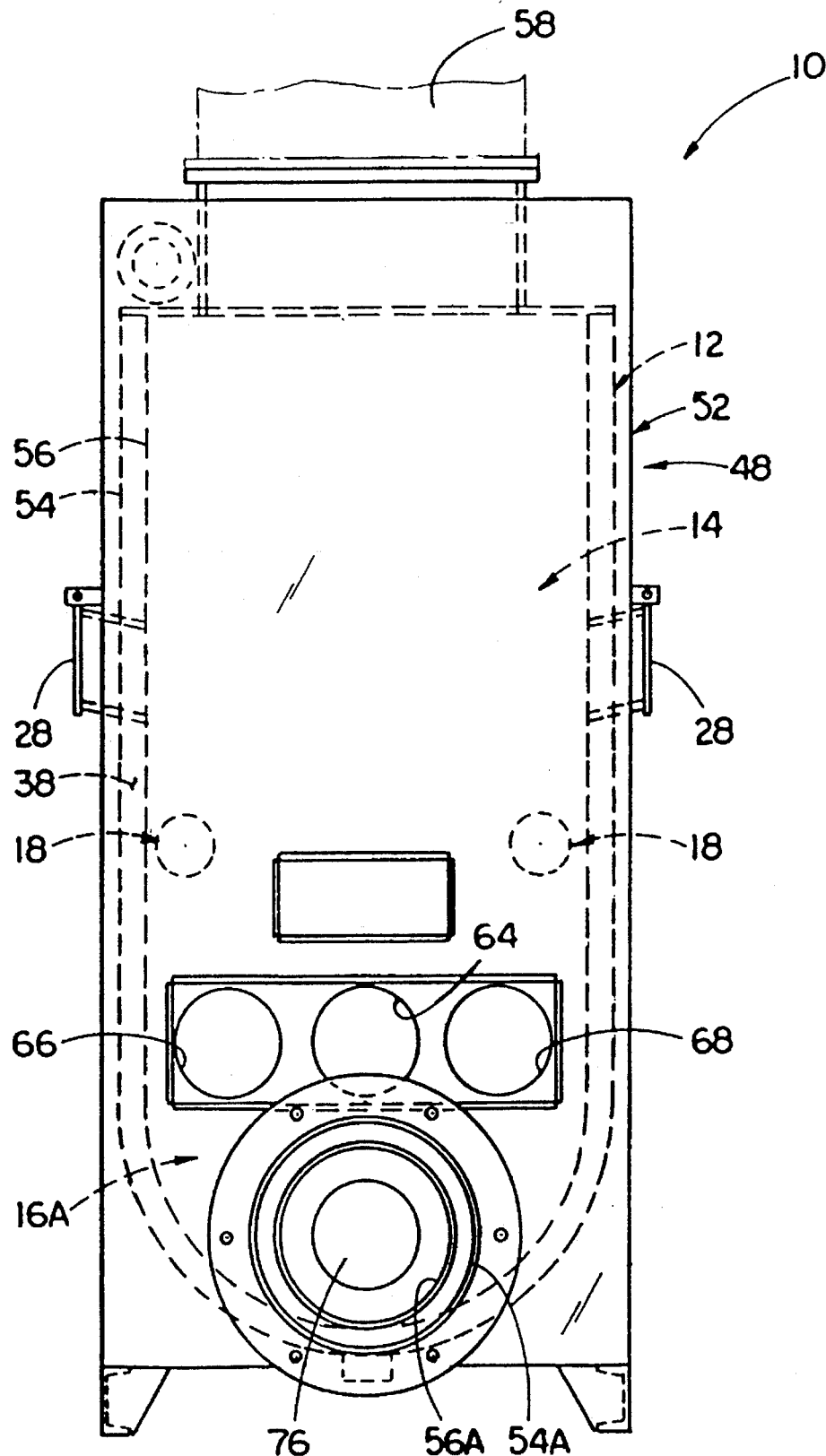
FIG. 4 is an enlarged opposite end elevational view of the first housing unit of the apparatus as seen along line 4—4 of FIG. 2.
Figure 6:
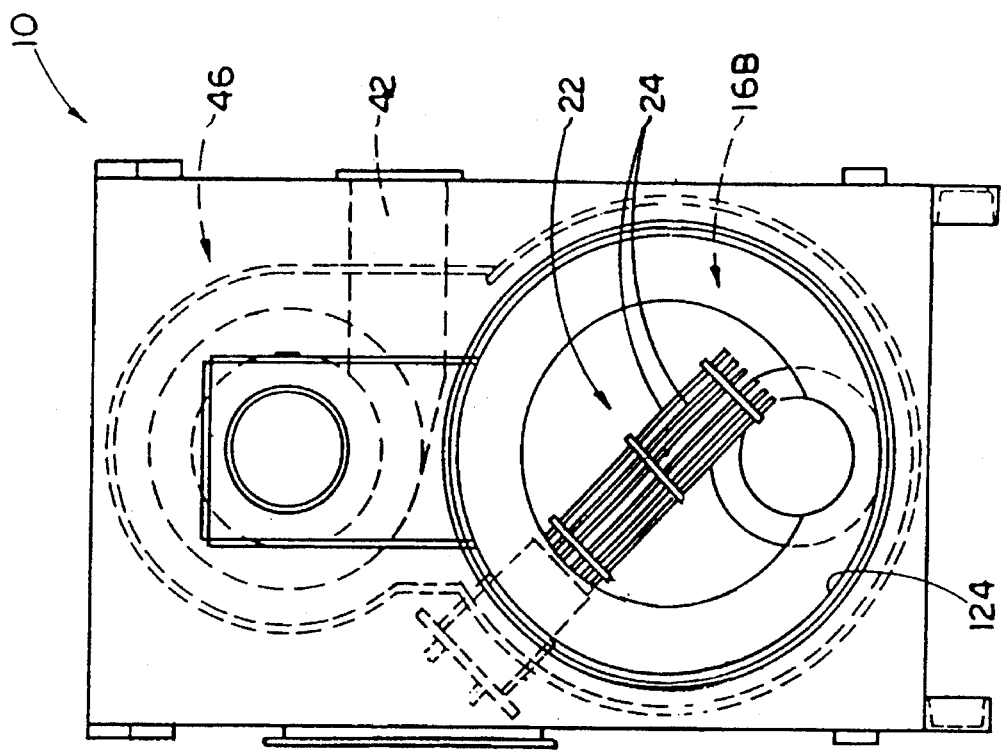
FIG. 6 is an enlarged opposite end elevational view of the second housing unit of the apparatus as seen along line 6—6 of FIG. 2.
Figure 5:
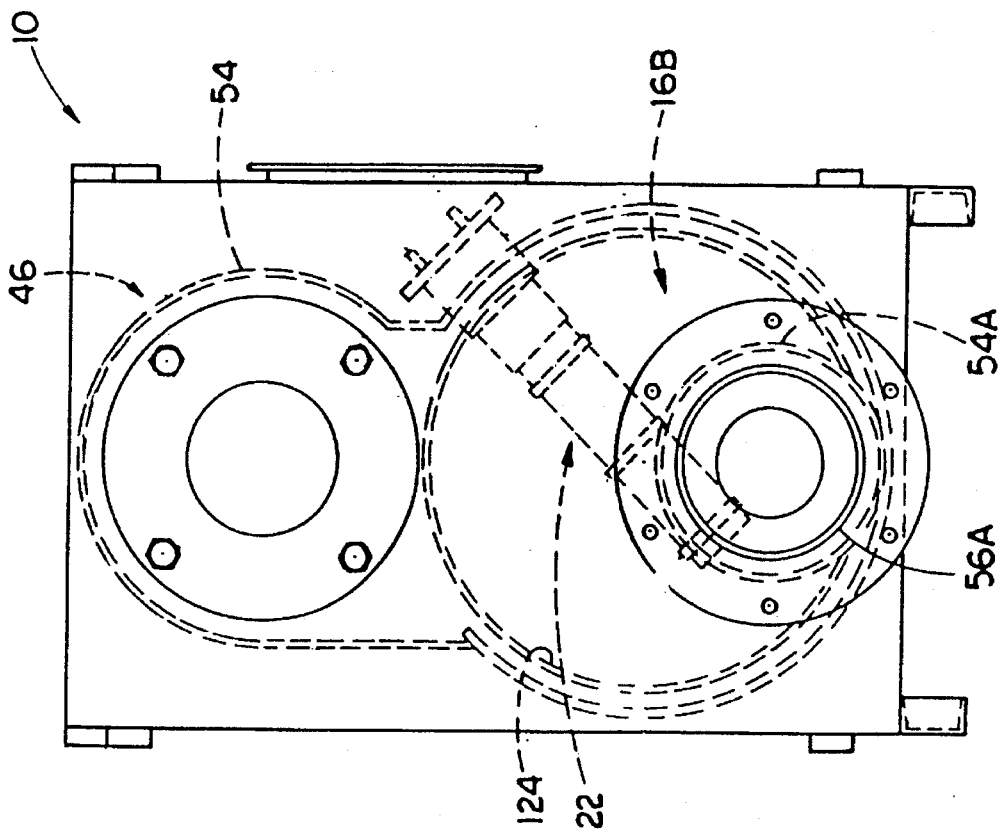
FIG. 5 is an enlarged end elevational view of a second housing unit of the apparatus as seen along line 5—5 of FIG. 2.
Figure 7:
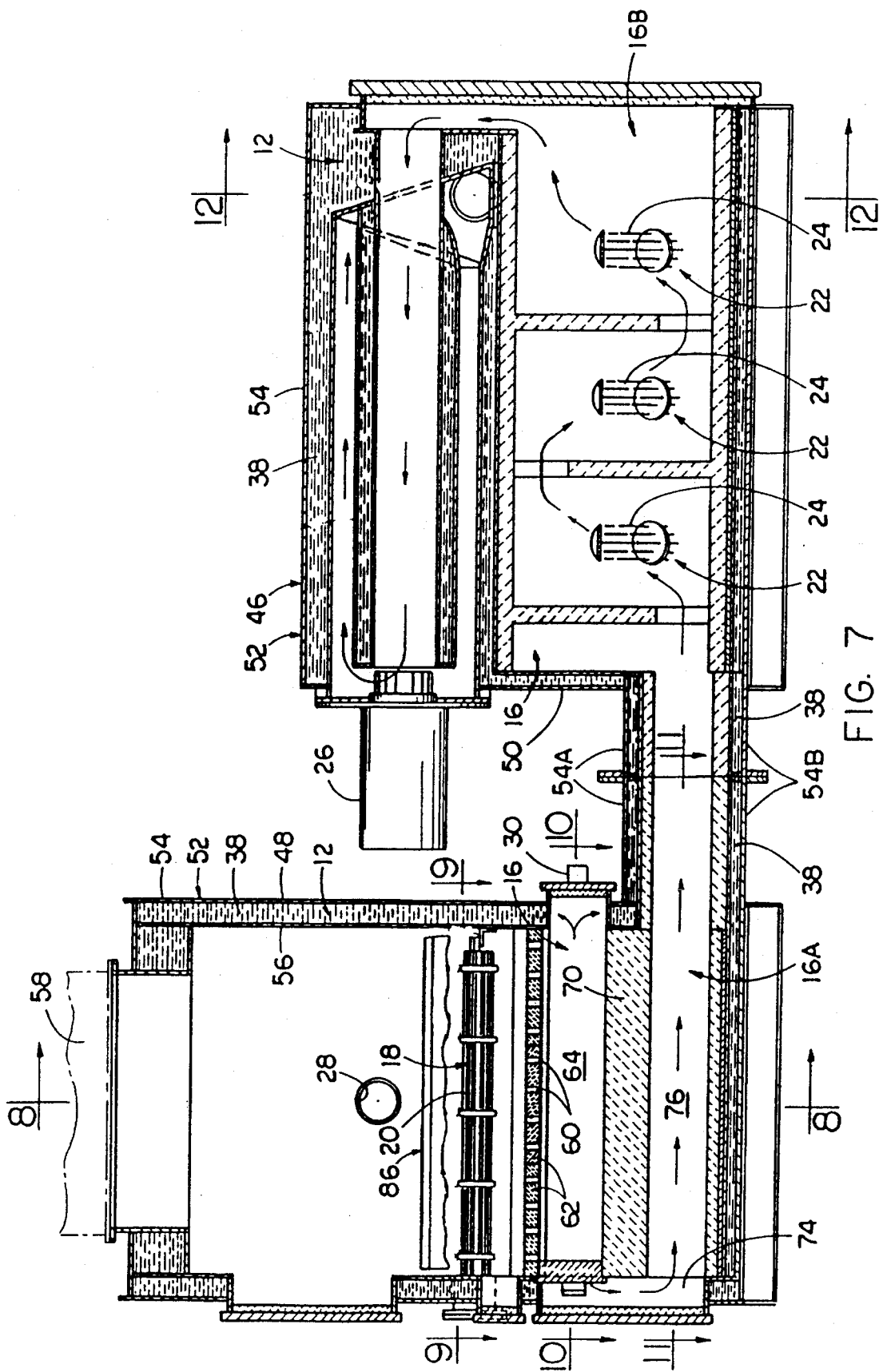
FIG. 7 is a longitudinal vertical sectional view of the apparatus taken along line 7—7 of FIG. 3.
Figure 8:
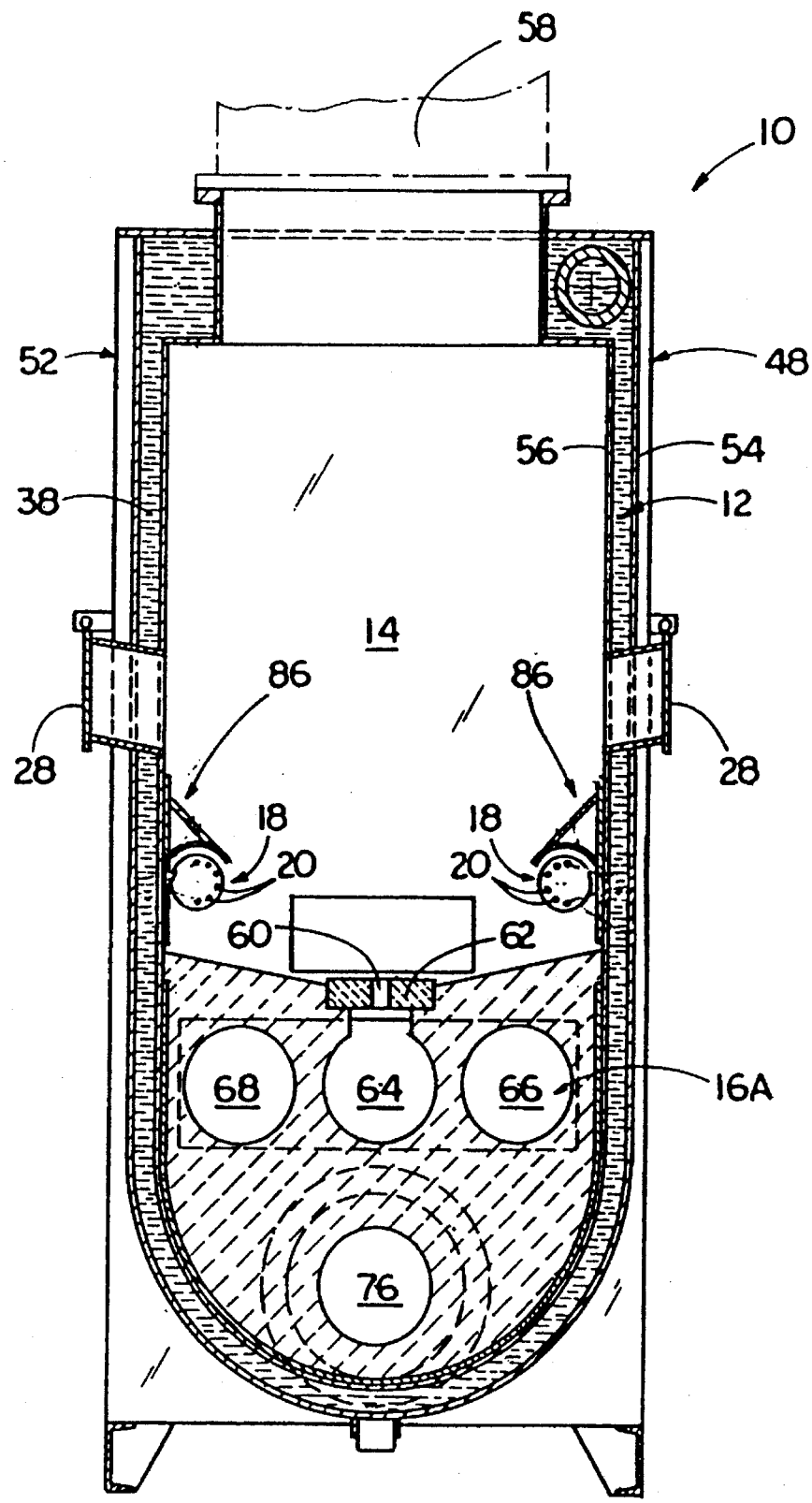
FIG. 8 is an enlarged vertical cross-sectional view of the first housing unit of the apparatus taken along line 8—8 of FIG. 7.
Figure 9:
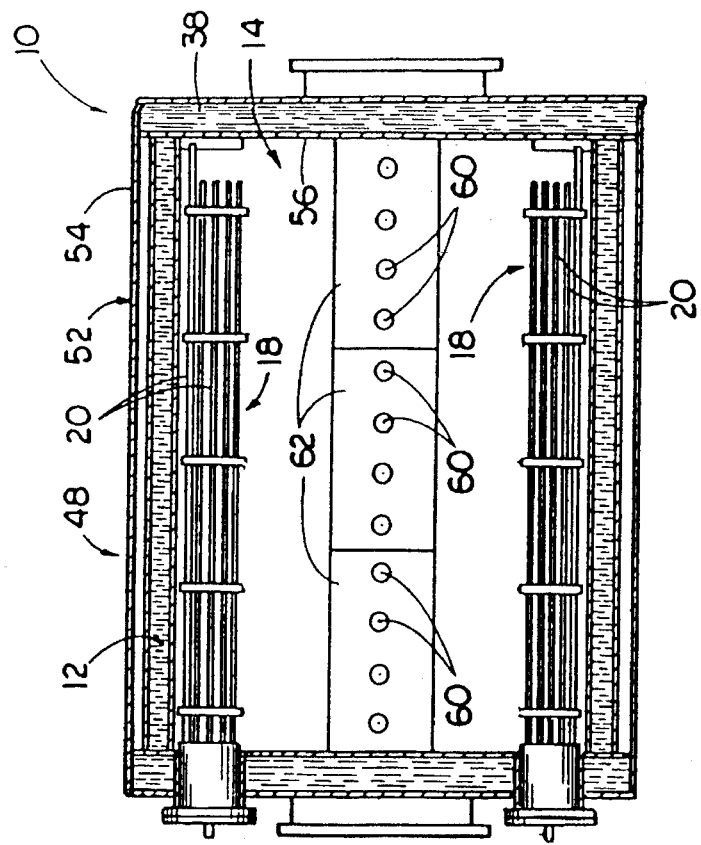
FIG. 9 is an enlarged horizontal cross-sectional view of the first housing unit of the apparatus taken along line 9—9 of FIG. 7.
Figure 10:
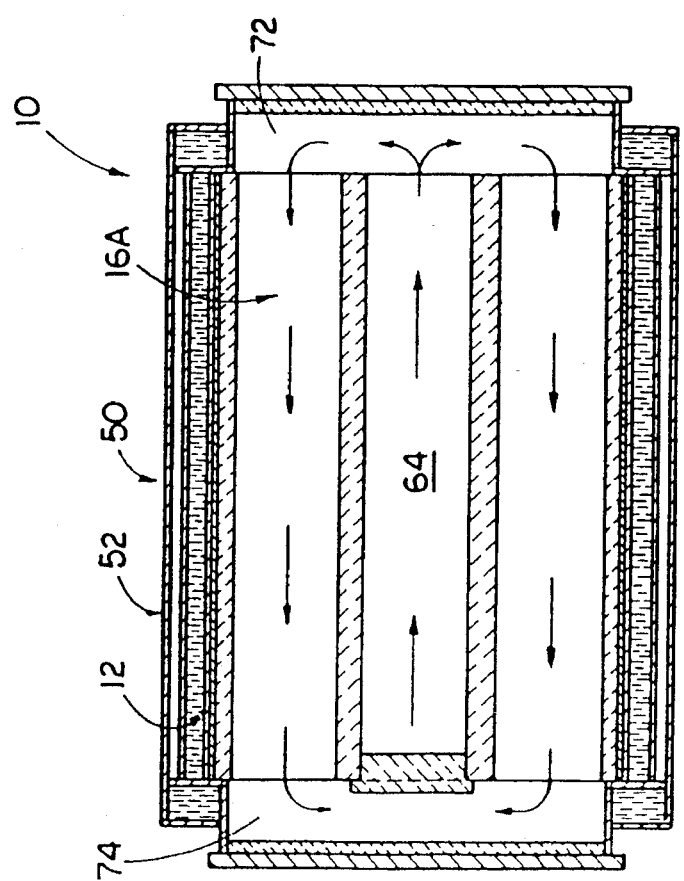
FIG. 10 is another horizontal cross-sectional view of the first housing unit of the apparatus taken along line 10—10 of FIG. 7.
Figure 12:
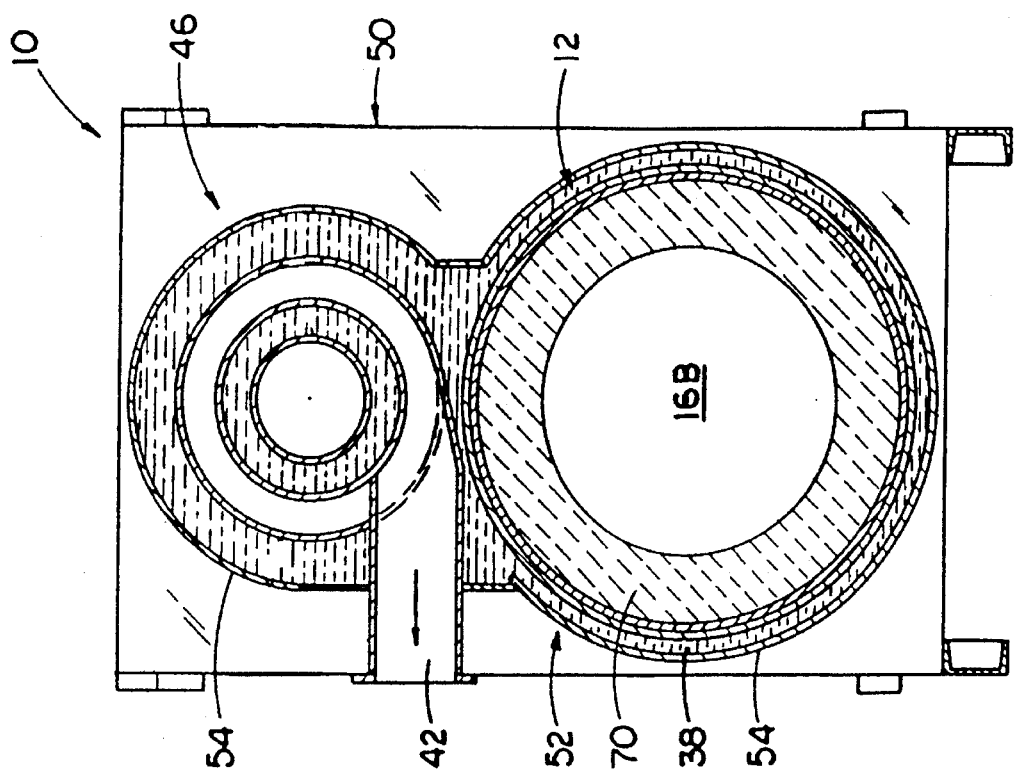
FIG. 12 is an enlarged vertical cross-sectional view of the second housing unit of the apparatus taken along line 12—12 of FIG. 7.
Figure 11:
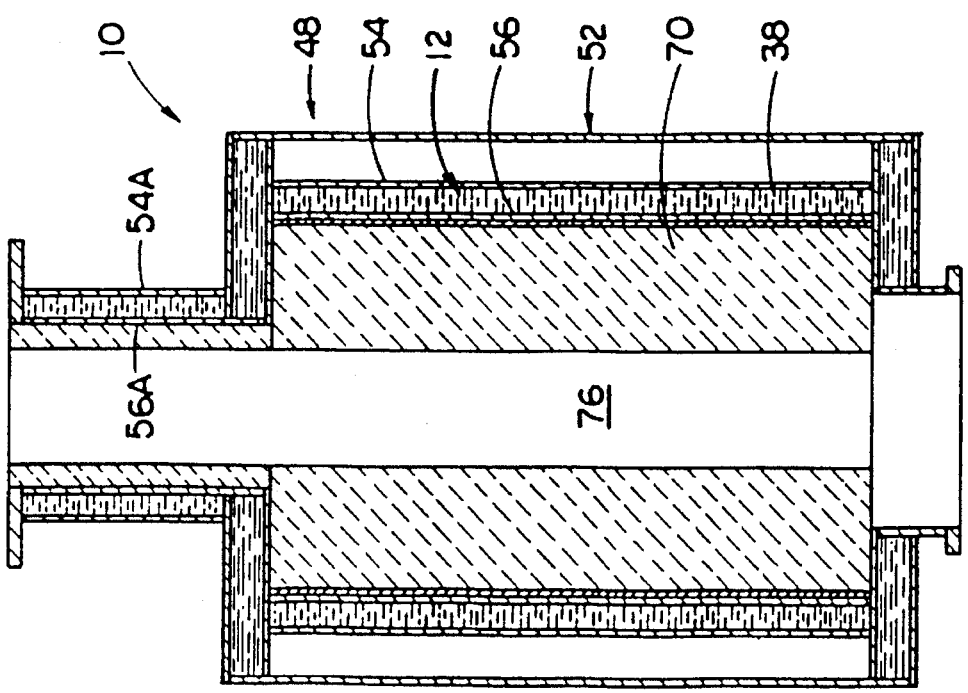
FIG. 11 is still another horizontal cross-sectional view of the first housing unit of the apparatus taken along line 11—11 of FIG. 7.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.
Material Processing Apparatus—In General Referring now to the drawings, and particularly to FIGS. 1, 2, 7, 13 and 14, there is illustrated an exemplary apparatus, generally designated 10, for controlled thermal processing of materials, and in particular for controlled disposal of biomedical waste materials, which is operated in accordance with the hydrocarbon release rate controlling method of the present invention. The material processing apparatus 10 basically includes a coolant jacketed vessel 12 defining a first pyrolysis chamber 14 and a second oxidation chamber 16. The apparatus 10 also includes one or more first heater units 18 having a plurality of elongated rod-like electric heating elements 20 mounted in the vessel 12 and being operable to electrically generate heat for pyrolyzing materials in the first chamber 14, and one or more second heater units 22 having a plurality of electric heating elements 24 mounted in the vessel 12 and being operable to electrically generate heat for oxidizing materials in the second chamber 16.

The apparatus 10 further includes an air flow generating means, preferably an induction fan 26 and a fan speed controller 27, connected in flow communication with the first and second chambers 14, 16, and first and second airflow inlet valves 28, 30 connected to the jacketed vessel 12. The apparatus also includes an air intake proportioning valve 31 connected in flow communication with the first and second air inlet valves 28, 30. The induction fan 26, proportioning valve 31, and first and second inlet valves 28, 30 function to produce separate primary and secondary variable flows of air respectively into and through the first and second chambers 14, 16. One suitable embodiment of the fan speed controller 27 is a commercially-available unit identified as GPD 503 marketed by Magnetek of New Berlin, Wis. One suitable embodiment of the valves 28, 30 is disclosed in U.S. Pat No. 4,635,899, the disclosure of which is incorporated herein by reference thereto. One suitable embodiment of the proportioning valve 31 is a pair of conventional air intake butterfly valves controlled by a standard proportioning motor marketed by the Honeywell Corporation. The respective amounts of air in the primary and secondary flows drawn through the first and second chambers 14, 16 by operation of the induction fan 26 are proportioned by the operation of proportioning valve 31 to separately adjust the ratio of the amounts of air flow routed to the first and second air inlet valves 28, 30. The respective amounts of air drawn in the primary and secondary flows are correspondingly varied by varying the speed of operation of the induction fan 26.

Still further at least three temperature sensors 32, 34, 36, such as conventional thermocouples, are mounted on the vessel 12 for sensing the temperatures in the first and second chambers 14, 16 and in the coolant circulating about a channel 38 defined by the jacketed vessel 12 about the first and second chambers 14, 16. Additionally, a gas sensor 40 is mounted on a discharge outlet 42 of the vessel 12 for sensing the concentration of a predetermined gas, for example oxygen, in the discharge gases. Also, a computer-based central control system 44 (FIG. 14) is incorporated in the apparatus 10 for controlling and directing the overall operation of the apparatus 10 in accordance with the hydrocarbon release rate controlling method of the present invention. One suitable computer which can be employed by the control system 44 is identified as PC-55 marketed by the Westinghouse Electric Corporation of Pittsburgh, Pa.

Further, as seen in FIGS. 7 and 12–14, the apparatus 10 includes a heat exchanger 46 connected in flow communication between the second chamber 16 and the discharge outlet 42. The heat exchanger 46 functions to remove heat from and thereby cool the coolant flowing through the channel 38 defined by jacketed vessel 12. As pointed out in FIG. 13, the heat removed by the heat exchanger 46 can be employed in other applications in the facility housing the material processing apparatus 10.

Figure 13:
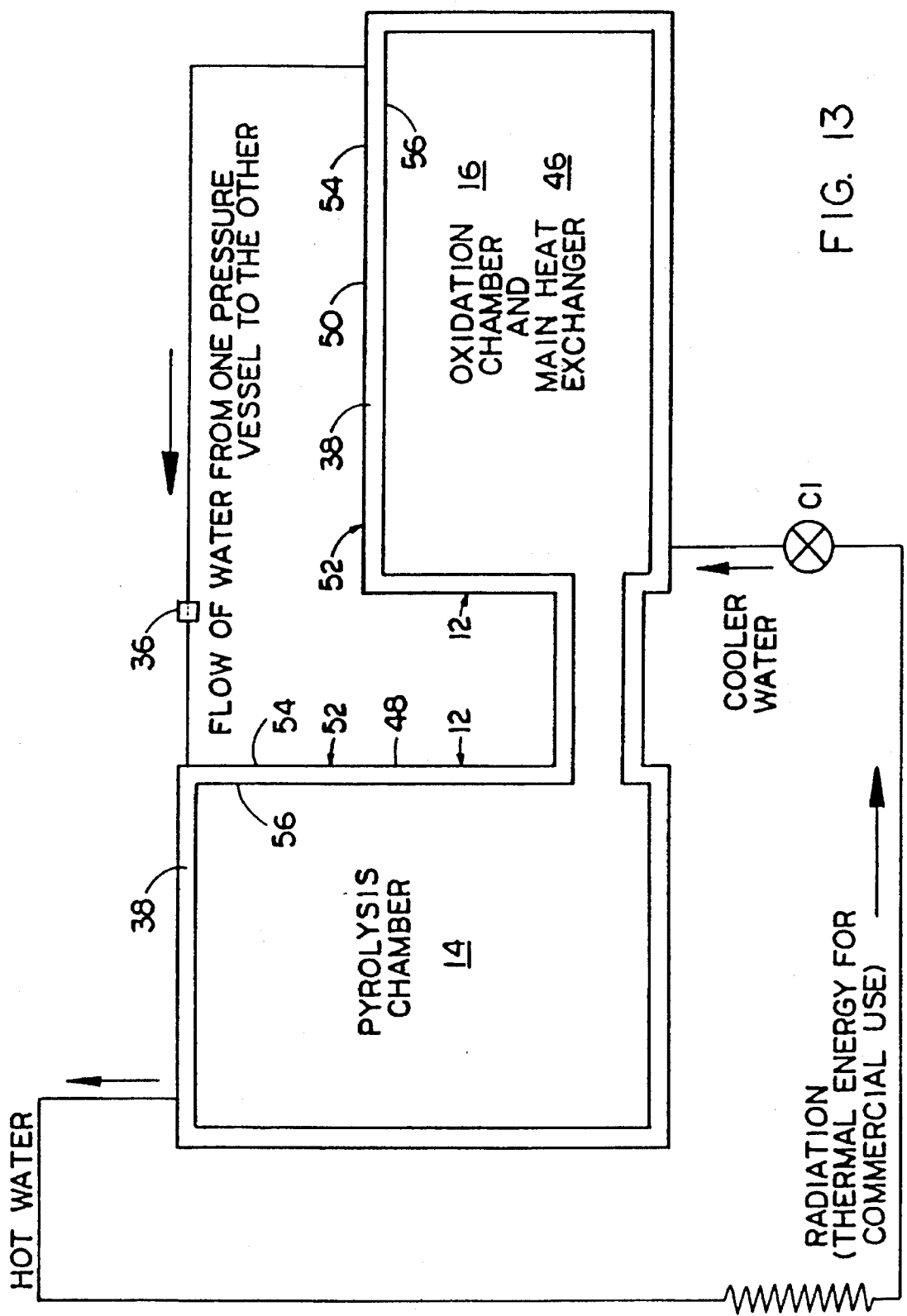
FIG. 13 is a block diagram of a coolant fluid circulation circuit employed by the apparatus of FIG. 1.

For many applications, the material processing apparatus 10 can be provided in the form of a single unit where all components of the apparatus are contained within the one unit. However, in order to accommodate space and installation requirements, there are other applications where the material processing apparatus 10 needs to be provided in the form of two separate first and second units 48, 50, as shown in FIGS. 1–12. Referring to FIGS. 1–12, the material processing apparatus 10 includes a casing 52 having outer and inner spaced walls 54, 56 forming the coolant jacketed airtight pressure vessel 12 inside of the inner wall 56 and the channel 38 between the outer and inner walls 54, 56. The channel 38 surrounds the vessel 12 and contains the flow of coolant fluid, such as water. FIG. 13 illustrates an example of the circulation flow path of the coolant fluid about the vessel channel 38 and between the first and second units 48, 50 of the vessel 12. As mentioned above, the vessel 12 of the apparatus 10 is separated into first and second units 48, 50 and has means in the form of a pair of tubular extensions 54A, 56A of the outer and inner walls 54, 56 which are fastened together to interconnect the first and second units 48, 50 in flow communication with one another.

Referring to FIGS. 7–11, the vessel 12 defines the first pyrolysis chamber 14 having an inlet 58 and the second oxidation chamber 16 connected in communication with the first pyrolysis chamber 14 and having the discharge outlet 42. The first chamber 14 in which the materials will be pyrolyzed receives the materials through the inlet 58 via operation of an automatic feeding system 59. The first chamber 14 of the vessel 12 for pyrolyzing materials is disposed in the first unit 48. The material, through pyrolysis, or burning in a starved oxygen atmosphere, is converted to a gas that exits the first chamber 14 by passing down through holes 60 in fire brick 62 formed in the bottom of the first chamber 14 and therefrom to the second chamber 16.

The second chamber 16 receives the pyrolyzed materials from the first chamber 14 and, after oxidizing the pyrolyzed materials therein, discharges the oxidized materials therefrom through the discharge outlet 42. The second chamber 16 has primary and secondary sections 16A, 16B for oxidizing materials in two successive stages. The primary section 16A is disposed in the first unit 48 of the vessel 12 between the first chamber 14 and the tubular extensions 54A, 56A. The secondary section 16B is disposed in the second unit 50 of the vessel 12.

The primary section 16A of the second chamber 16 contains a series of serpentine passages or tunnels 64, 66, 68 defined in a mass 70 of refractory material contained in the first unit 48. As the pyrolyzed gas passes down through the holes 60 in fire brick 62 formed in the bottom of the first chamber 14, it enters the center tunnel 64, which is plugged at one end, and passes therethrough in a rearward direction toward the rear of the first unit 48 to a rear manifold 72, then splits into two gas flows and reverses in direction to pass toward the front of the first unit 48 through the opposite side tunnels 66, 68 (on the opposite sides of the plugged center tunnel 64) as it is being oxidized, and then to a front manifold 74 where the oxidized gas passes down to a lower tunnel 76, again reversing in direction, to pass towards and through the second unit 50.

The refractory mass 70 has an upper exterior surface 70A which is exposed to the first chamber 14. The series or arrangement of serpentine passages 64, 66, 68 formed in the refractory mass 70 define the primary section 16A of the second chamber 16 and provide communication with the first chamber 14. The refractory mass 70 also is surrounded by the jacketed vessel 12 and maintained in a heated condition at elevated temperatures by the heating produced in the first chamber 14 by the first heater units 18 and by the pyrolyzing and oxidizing of materials in the respective first and second chambers 14, 16. The heated condition of the refractory mass 70, in turn, causes heating and oxidizing of materials which come in close proximity to the exterior surface 70A thereof. By the provision of the refractory mass 70 and maintenance of its heated condition at elevated temperatures, the waste material in the first chamber 14 which comes in close proximity to or contact with the upper exterior surface 70A of the refractory mass 70 is being continuously heated from underneath by the refractory mass 70 which increases oxidation of difficult material present in the first chamber 14 and contributes to the substantially complete conversion thereof to the carbon-free residue ash. It should be noted here that in keeping with the principles of the present invention, other means for heating and maintaining the refractory mass at elevated temperatures can be employed, such as electrical heaters or the like (not shown) embedded in the refractory mass.

The secondary section 16B of the second chamber 16 is located in the second unit 50. The oxidized gas from the primary section 16A of the second chamber 16 flows through the lower tunnel 76 in a direction toward the rear of the first unit 48, through the tubular extensions 54A, 54B, and into the secondary section 16B in the second unit 50. The secondary section 16B has a series of spaced air flow baffles 78 with offset openings 80 extending across the flow path of air through secondary section 16B.

The heat exchanger 46 is also located in the second unit 50 above the secondary section 16B of the second chamber 16. The upper heat exchanger 46 has the induction fan 26 connected at one end which operates to draw the gases from the first chamber 14 down through the fire brick 62 into the primary section 16A of the second chamber 16. The gases then flow through the tunnels 64, 66, 68 of the primary section 16A, back through the secondary section 16B of the second chamber 16, then up and forwardly through the center of the heat exchanger 46 to the center of the induction fan 26 which then forces the exhaust gas outwardly and rearwardly around and along the heat exchanger 46 for exiting through discharge outlet 42 into a wet scrubber 82. The exhaust gas is virtually free of any pollution and the original material has been almost completely oxidized so that only a very small amount of fine minute dust or powder particles are collected in a particle separator (not shown).

Referring to FIGS. 1, 7–9, and 14, there is illustrated a pair of heat generator assemblies 84 incorporated in the first chamber 14 of the apparatus 10. The heat generator assemblies 84 are mounted horizontally through the first chamber 14 and adjacent opposite side portions of the inner wall 56 of the casing 52. Each heat generator assembly 84 includes the first heater unit 18 and an elongated deflector structure 86 mounted adjacent to and along the electric heating elements 20 of the first heating unit 18. The first heater unit 18 is mounted to the vessel 12 and extends horizontally into the first chamber 14 between opposite ends thereof and along one of the opposite sides thereof. The first heater unit 18 is powered by a power controller 87 which, in turn, is powered by an electrical power supply (not shown) and controlled by the computer-based control system 44 for producing heating of materials received in the first chamber 14 to cause pyrolyzing of the materials into gases. One suitable embodiment of the power controller 87 is a commercially-available unit identified as SSR2400C90 marketed by Omega Engineering of Stanford, Conn. The plurality of elongated electric heating elements 20 extend in generally parallel relation to one another and are constructed of electrically-resistive material operable for emitting heat radiation. The deflector structure 86 extends in circumferential relation partially about the electric heating elements 20 so as to deflect the heat radiation in a desired direction away from the electric heating elements 20 and from the adjacent side of the first chamber 14.

Each of the second heater units 22 employed in the secondary section 16B of the second chamber 16 has substantially the same construction and configuration as the first heater unit 18 described above with one difference. The difference is that the electric heating elements 24 of the second heater unit 22 are distributed and spaced about the full circle instead of only about one-half of the circle. The second heater units 22 are also powered by another power controller 87.

Operation of Computer-Based Control System

Figure 14:
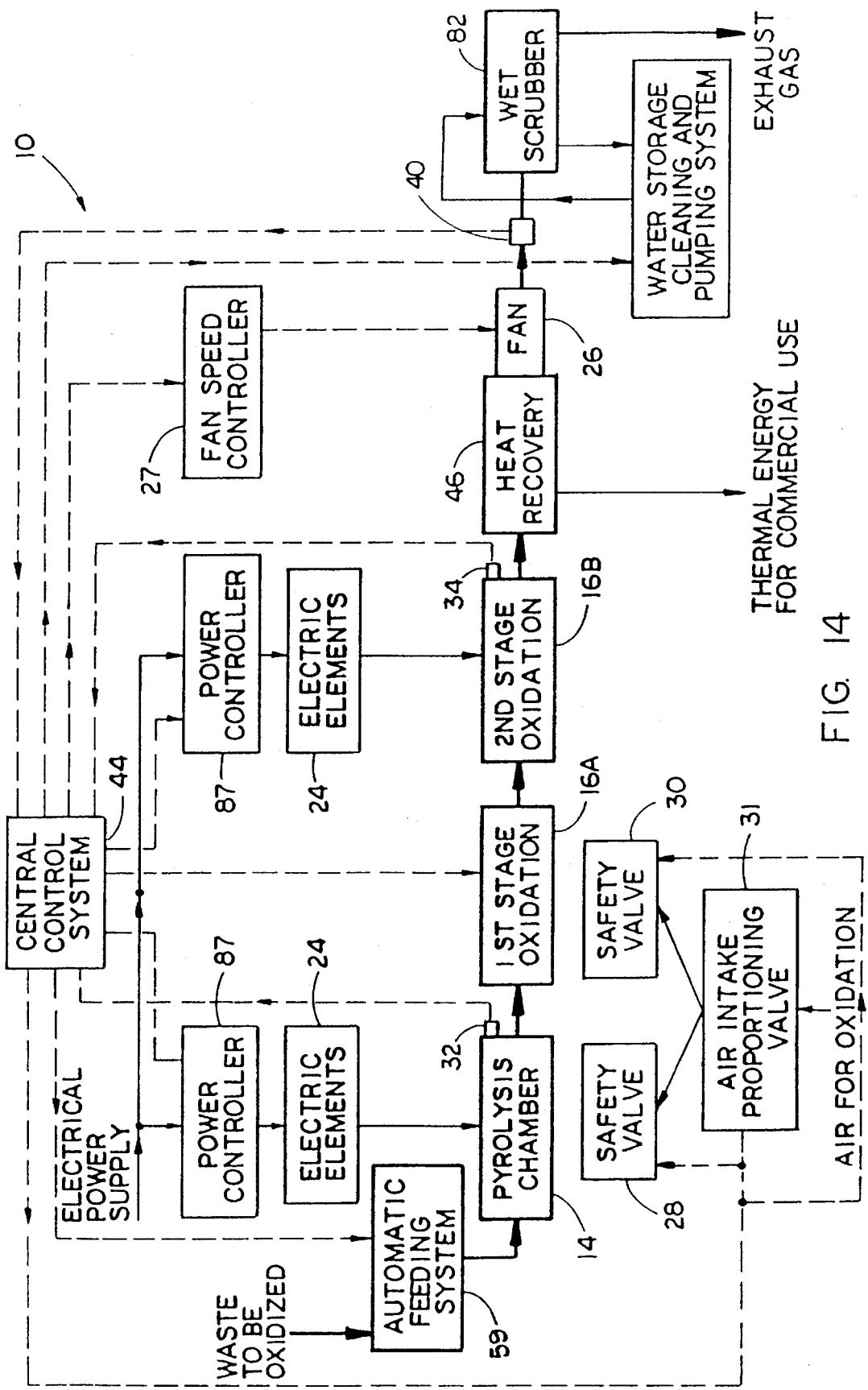
FIG. 14 is a functional block diagram of the material processing apparatus of FIG. 1.

Referring to FIGS. 14–17, there is functionally illustrated the components of and the operative steps performed by the material processing apparatus 10 under the monitoring and control of the computer-based central control system 44 for effecting optimal pyrolyzing and oxidizing of the materials therein to provide control of the hydrocarbon release rate in accordance with the present invention. FIG. 14 provides a functional block diagram of the material processing apparatus 10 illustrating the directions of interactions between the components of the apparatus 10 to maintain the target oxygen concentration and thereby control the hydrocarbon release rate. FIGS. 15A and 15B, taken together, depict a flow chart 88 of an exemplary sequence of software or program steps executed in the central control system 44 for controlling and directing the overall operation of the material processing apparatus 10. FIGS. 16A and 16B, taken together, depict another flow chart 90 of an exemplary oxygen-based control algorithm utilized by the software program in the central control system 44 to carry out the proportioning of the air flow through the first and second chambers 14, 16 of the apparatus 10. While flow charts 88 and 90 are believed to be substantially self-explanatory and readily understood by a person having ordinary skill in this art, certain of the features of the control system 44 with reference to the flow charts are described hereinafter.

Basically, the material processing apparatus 10 operates through one cycle to thermally process, that is, to pyrolyze and oxidize, a predetermined batch of material, such as biomedical waste material, typically of widely varying energy values or contents. The central control system 44 functions to operate and regulate the material processing apparatus 10 during each batch processing cycle by controlling the operation of the first and second heater units 18, 22, the position of the air intake proportioning valve 31 and the speed of the induction fan 26. The central control system 44, under control and direction of a software program stored in its internal memory, repetitively and at high speed, receives inputs, processes the inputs and generates outputs. The inputs received by the central control system 44 from the various temperature and gas sensors 32, 34, 36, 40 contain information about the current states of the pyrolysis process occurring in the first chamber 16 and of the oxidation process occurring in the primary and secondary sections 16A, 16B of the second chamber 16. Proportional, Integral, Derivative (PID) control algorithms for regulating induction fan speed and proportioning valve position are contained in the software program. These algorithms are employed by the central control system 44 to process the inputted information by integrating the information into a logical sequence of decision steps and then generating an appropriate set of output instructions to ensure that the pyrolysis and oxidation processes and thus the hydrocarbon release rate continue at an optimum level.

More particularly, the control system 44 is responsive to the temperatures sensed in the first and second chambers 14, 16 by temperature sensors 32, 34 and in the coolant circulating through the channel 38 of the jacketed vessel 12 by temperature sensor 36. The control system 44 also is responsive to the proportion, or concentration, of a preselected gas, such as oxygen, sensed in the discharge gases by the gas sensor 40. The control system 44, in response to these various temperatures sensed and to the concentration of oxygen sensed, functions to control the position of the air intake proportioning valve 31 so as to adjust the ratio of, or proportion, the amount of primary air flow to the amount of secondary air flow through the first and second inlet valves into the first and second chambers 14, 16. Also, the control system 44, in response to these various temperatures sensed and to the concentration of oxygen sensed, functions to control the operation of the induction fan 26 via the fan speed controller 27 so as to adjust the amounts (but not the proportion) of primary and secondary air flows into the first and second chambers 14, 16.

Figure 15A:
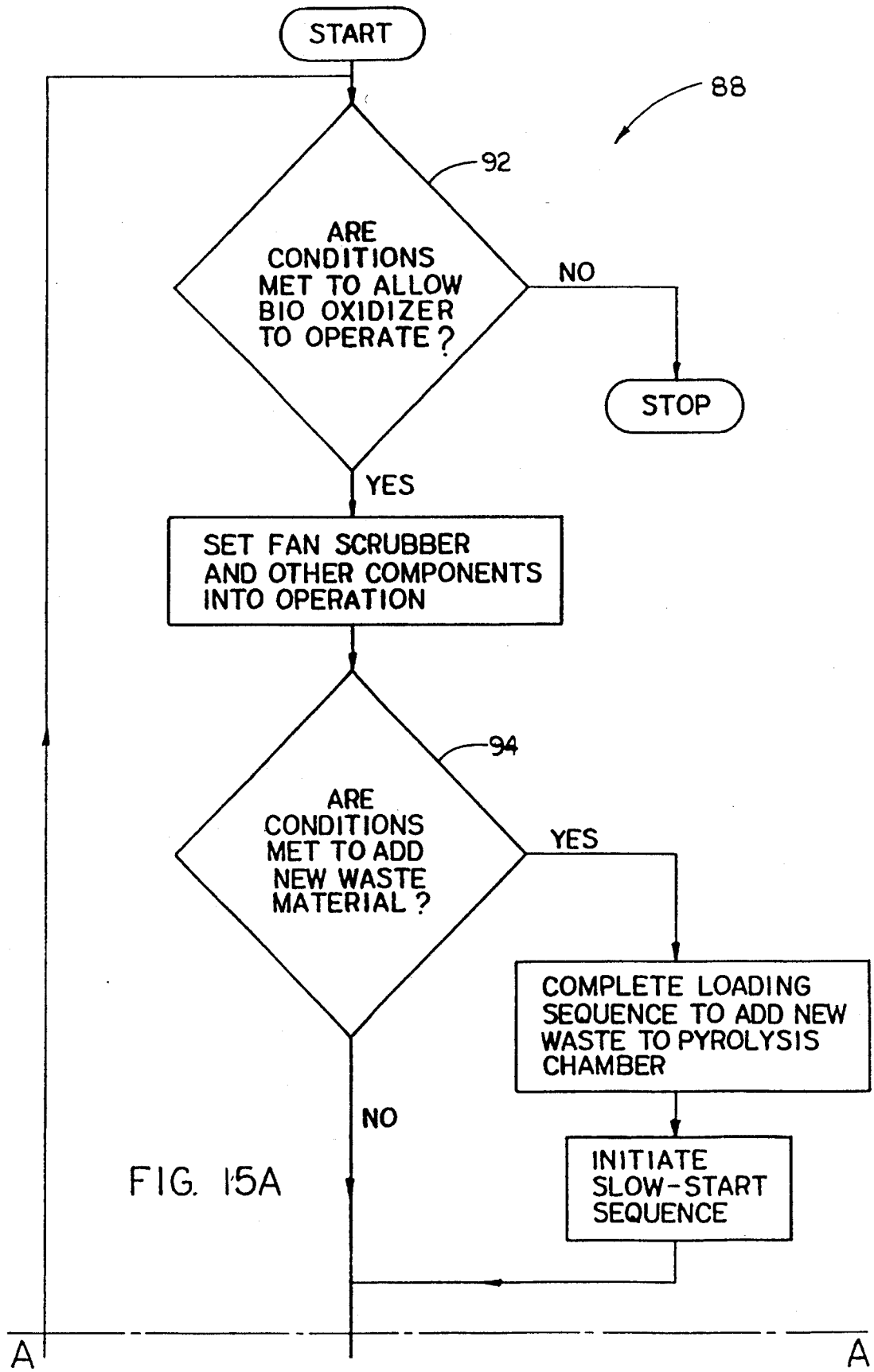
FIGS. 15A and 15B, taken together, show a flow chart of the overall operation of the apparatus of FIGS. 1 and 14.
Figure 15B:
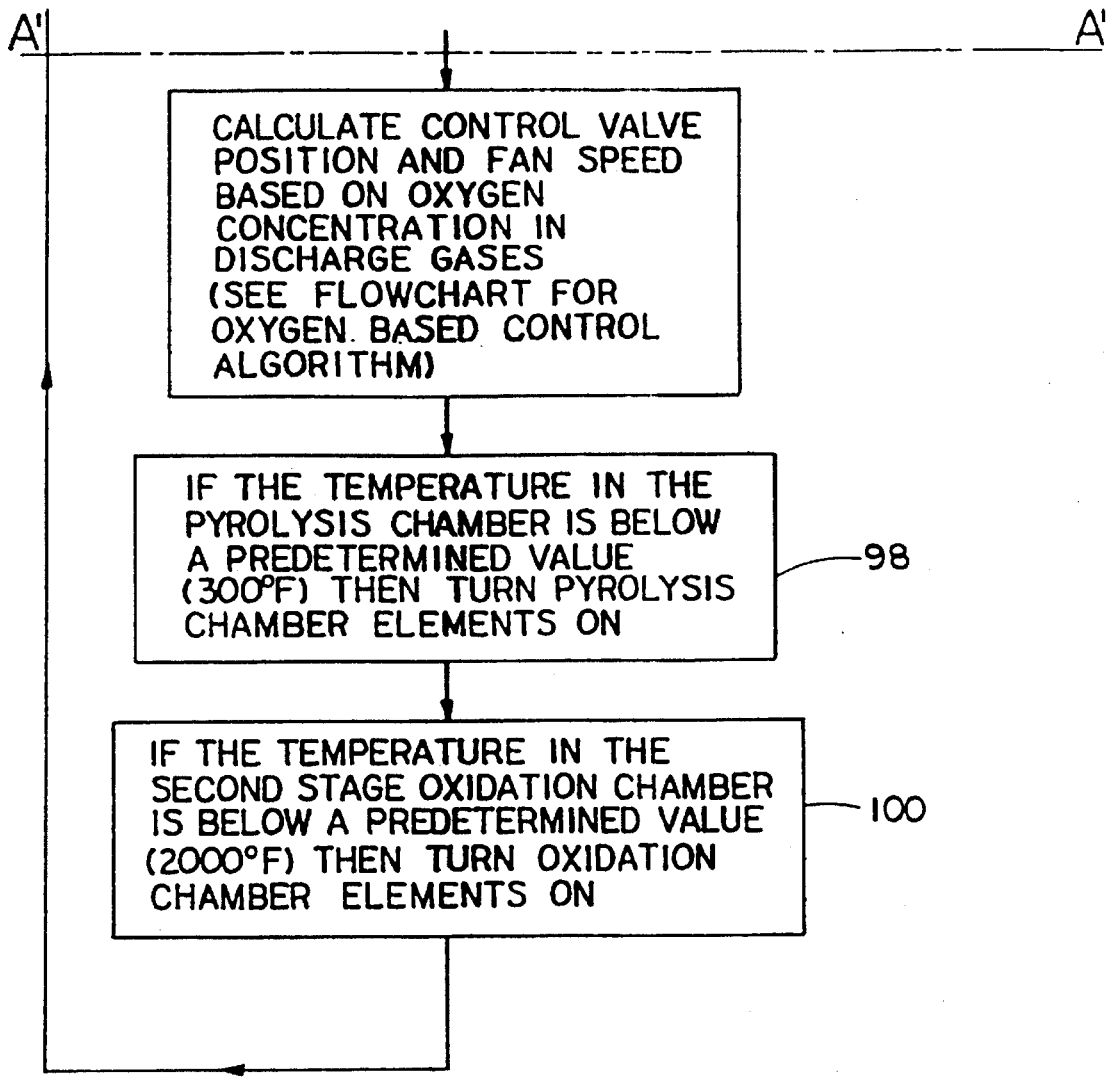
Figure 16A:
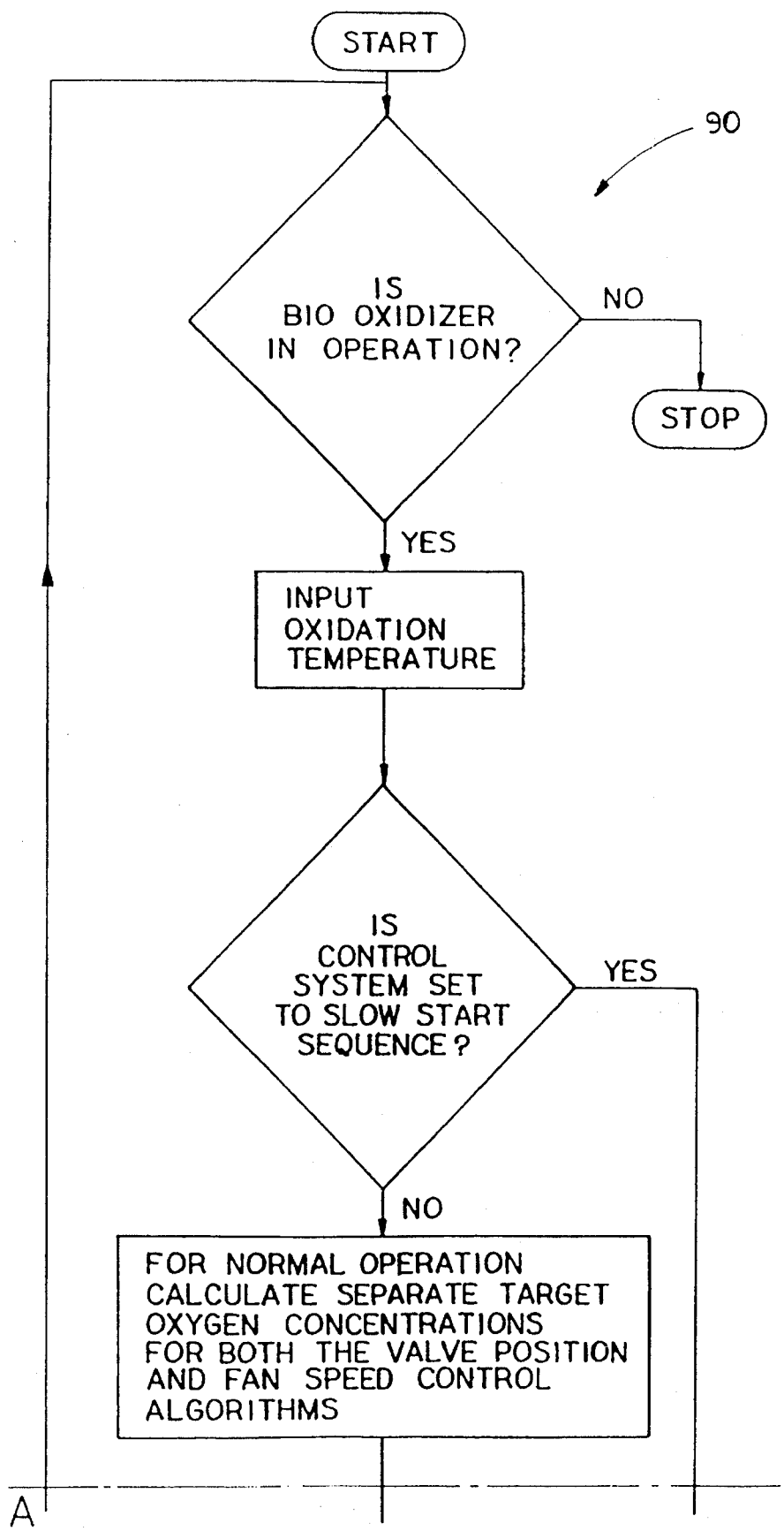
FIGS. 16A and 16B, taken together, show another flow chart of the operation of an oxygen-based control algorithm underlying the hydrocarbon release rate controlling method performed by the apparatus of FIGS. 1 and 14.
Figure 16B:
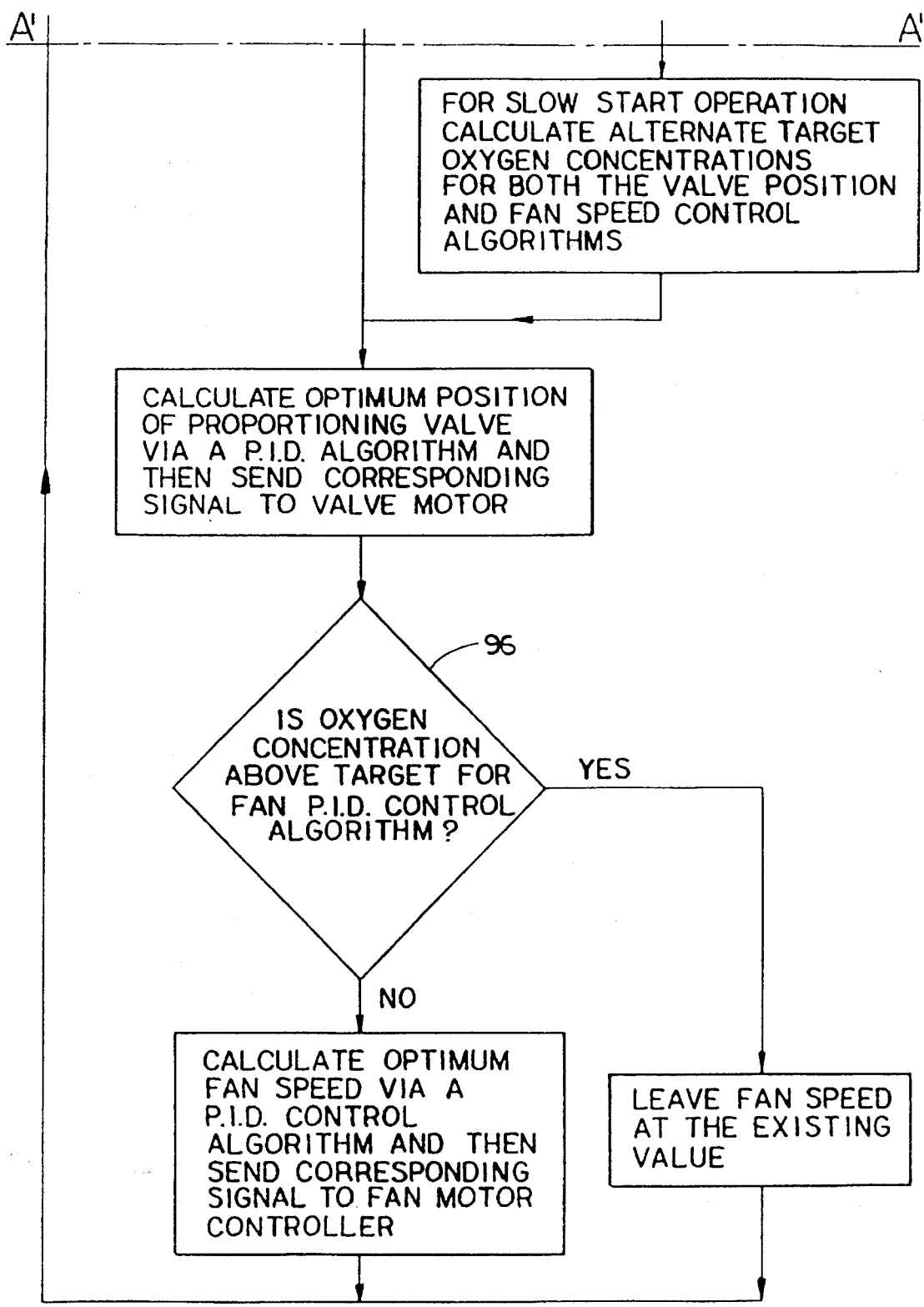

Referring to the flow chart 88 of FIGS. 15A and 15B, at initiation of a new batch processing cycle, the central control system 44 will first determine from the inputted information if the conditions existing in the first and second chambers 14, 16 are such as to allow the apparatus 10 to operate (as per diamond 92) and to allow adding of the new batch to the first chamber 14 of the apparatus 10 (as per diamond 94). If the answer to diamond 92 is "yes", then the components of the apparatus 10 are set into operation to cause an initial heating or warm-up of the chambers 14, 16. If the answer to diamond 94 is "yes", then the new batch is loaded into the first chamber 14 and a slow-start sequence is initiated during which the desired target level of oxygen concentration is temporarily increased and the hydrocarbon release rate is temporarily reduced. The slow-start sequence is employed to assure a stable operation of the apparatus 10 during the start of a new cycle upon receipt of the new batch of feed material in the first chamber 14. Since it is not known what the energy content of the newly-introduced batch of feed material is, that is, whether it contains a large proportion of highly volatile material or not, the slow-start sequence will ensure that uncontrolled release of unburned hydrocarbons does not occur during this part of the new batch processing cycle. In essence, therefore, when the control system 44 is executing the slow-start sequence, it raises the target oxygen concentrations for a preset period of time as illustrated in the graph seen in FIG. 18.

The overall objective is to control the hydrocarbon release rate so as to ensure avoidance of emission of harmful substances and to ensure that the residue ash is virtually carbon-free. During the pyrolyzing and oxidizing processing cycle of the apparatus 10, the required temperatures and correct primary and secondary air flows must be maintained in the first and second chambers 14, 16 in order to obtain these desired ultimate results. The inputs of oxygen concentration compared to a desired target (for example 6%) as per diamond 96 of the flow chart 90 of FIGS. 16A and 16B and of temperatures in the first and second chambers 14, 16 compared to desired targets (for example, 300° F. and 2000° F.) as per blocks 98, 100 of flow chart 88 of FIGS. 15A and 15B are received and processed by the central control system 44 to control the position of the proportioning valve 31 to set the primary and secondary air flows and to control the speed of the induction fan 26 in order to maintain the pyrolyzing and oxidizing processes and thus the hydrocarbon release rate at optimum levels. For example, if the level of oxygen concentration sensed in the discharge outlet 42 is too high, then that means that insufficient pyrolysis is occurring in the first chamber 14. To rectify this condition, the ratio of the primary and secondary air inflows is changed by regulating the air intake proportioning valve 31 to increase the amount of air flow entering the first chamber 14 and to decrease the amount of air flow entering the second chamber 16. If the level of oxygen concentration sensed is still too high, then that means that the amount of air in both the primary and secondary flows needs to be decreased by slowing down the speed of the induction fan 26. If the elevated oxygen concentration condition were to persist, the excess air inflow will cool down the chambers below the target levels. The first and second heater units 18, 22 are employed to preheat the chambers 14, 16 and to ignite the oxidation process and also to raise the temperatures of the chambers whenever their temperatures decrease below the preset targets.

The fan speed control algorithm and air flow proportioning algorithm also establish the rates at which corrective actions are taken in order to ensure that the pyrolysis and oxidation processes continue at an optimum level to ensure proper control of the hydrocarbon release rate. The rates at which the necessary corrective changes occur are higher when too little concentration of oxygen is sensed in the discharge gases than when too much concentration of oxygen is sensed. This is because too little concentration of oxygen indicates a more serious situation such being that inadequate oxidation is occurring and, therefore, potentially pollution-causing gases are being exhausted by the apparatus 10. Therefore, for example, the rate at which changes in fan speed and proportioning of primary and secondary air flows occur when an oxygen concentration deficit condition is sensed can be twice the rate at which the same changes occur when an oxygen concentration surplus condition is sensed.

Interdependent control of the fan speed and the proportioning valve position based on oxygen concentration in the discharge gases is one of the key aspects for controlling the hydrocarbon release rate and thus the processing of materials in the processing apparatus 10. Using two separate PID algorithms, the fan speed and valve position are varied as the oxygen concentration in the discharge gases varies. Preferably, the target oxygen concentration level for the fan control PID algorithm is preset at 1% lower than the target oxygen concentration level for the proportioning valve PID algorithm. Thus, if the proportioning valve position is below 100% air flow to the pyrolysis chamber 14, the speed of the fan is not permitted to be decreased by the fan control PID algorithm. Programming the control system 44 in such manner will ensure that maximum throughput is encouraged while maintaining stable operating conditions. The following examples will assist in gaining an understanding of how the two PID control algorithms relate to each other where the oxygen concentration target for the fan PID algorithm is set at 6% and for the proportioning valve PID algorithm is set at 7%:

a) if the oxygen concentration level is sensed at 5%, then the fan speed will be increased and the proportioning valve position will be adjusted to decrease the air to the pyrolysis chamber 14.

b) if the oxygen concentration level is sensed at 6.5%, then the fan speed will be increased and the proportioning valve position will be adjusted to increase air to the pyrolysis chamber 14.

c) if the oxygen concentration level is sensed at 8%, then the fan speed will hold until the proportioning valve position is adjusted to increase air 100% to the pyrolysis chamber 14 and then the fan speed will decrease.

Underlying the present invention is recognition by the inventors herein that the direct correlation or correspondence between the hydrocarbon release rate and the concentration of a preselected gas, preferably oxygen, in the discharge gases can be used to control the hydrocarbon release rate during operation of the apparatus 10. For the apparatus 10 to be able to accommodate feed materials of widely varying energy contents as is needed in most waste disposal applications, and certainly with respect to biomedical waste materials, the apparatus 10 must be operated with a hydrocarbon release rate that avoids generation and emission of unburned hydrocarbons. However, it is not possible to determine in advance the energy value or content of the batches of material which are fed into the apparatus 10 in order to be able to adjust the operation of the apparatus 10 to arrive at the desired hydrocarbon release rate. The inventors herein recognized that due to the direct correspondence between the oxygen concentration in the discharge gases and the hydrocarbon release rate, if only the oxygen concentration is controlled and maintained at a desired target then automatically the hydrocarbon release rate is controlled and maintained at the desired optimum level. The inputs to the control system 44 which are processed to control and maintain the oxygen concentration at the desired target include the temperatures in the first and second chambers 14, 16 and in the jacketed vessel channel coolant and the concentration of the preselected gas sensed in the discharge gases. These inputs are processed by the software program in the control system 44 to generate outputs which control the primary and secondary flows of air into the first and second chambers 14, 16 so as to proportion and to vary the respective amounts thereof and thereby adjust the hydrocarbon release rate occurring in the apparatus 10 so as to maintain the oxygen concentration in the discharge gases at the desired preset target which will correspond to the generation of substantially harmless discharge gases and production of substantially carbon-free residue ash.

More particularly, if the hydrocarbon release rate begins to exceed the optimum level, this will result in the occurrence of an oxygen concentration in the discharge gases lower than the desired preset target. This deficiency will be detected by the oxygen sensor 40 in the heat recovery exhaust and transmitted to the control system 44. The control system 44 will then adjust the proportioning valve 31 to reduce the air flow into the pyrolysis or first chamber 14 and increase it to the primary section 16A of the oxidation or second chamber 16. As less oxygen is let into the first chamber 14, heat generation by pyrolysis reaction in this chamber is reduced. Since the first chamber 14 is surrounded by the coolant jacketed vessel 12, the surface of the waste materials therein will be cooled and thereby lower the hydrocarbon release rate to the optimum level. On the other hand, if the hydrocarbon release rate begins to go below the optimum level, this will result in the occurrence of an oxygen concentration in the exhaust which is greater than the desired target. The control system 44 will detect this condition via the oxygen sensor 40 and begin to adjust the proportioning valve 31 so that more air is fed into the first or pyrolysis chamber 14 and less air is fed into the primary section 16A of the second or oxidation chamber 16, increasing heat generation in the first chamber 14 and thereby increasing the hydrocarbon release rate back to the optimum level. It is seen, therefore, that the control system 44 is continuously adjusting the proportioning valve 31 to tend toward the optimum hydrocarbon release rate as evidenced by the sensed oxygen concentration being at or near the desired target.

Figure 17:
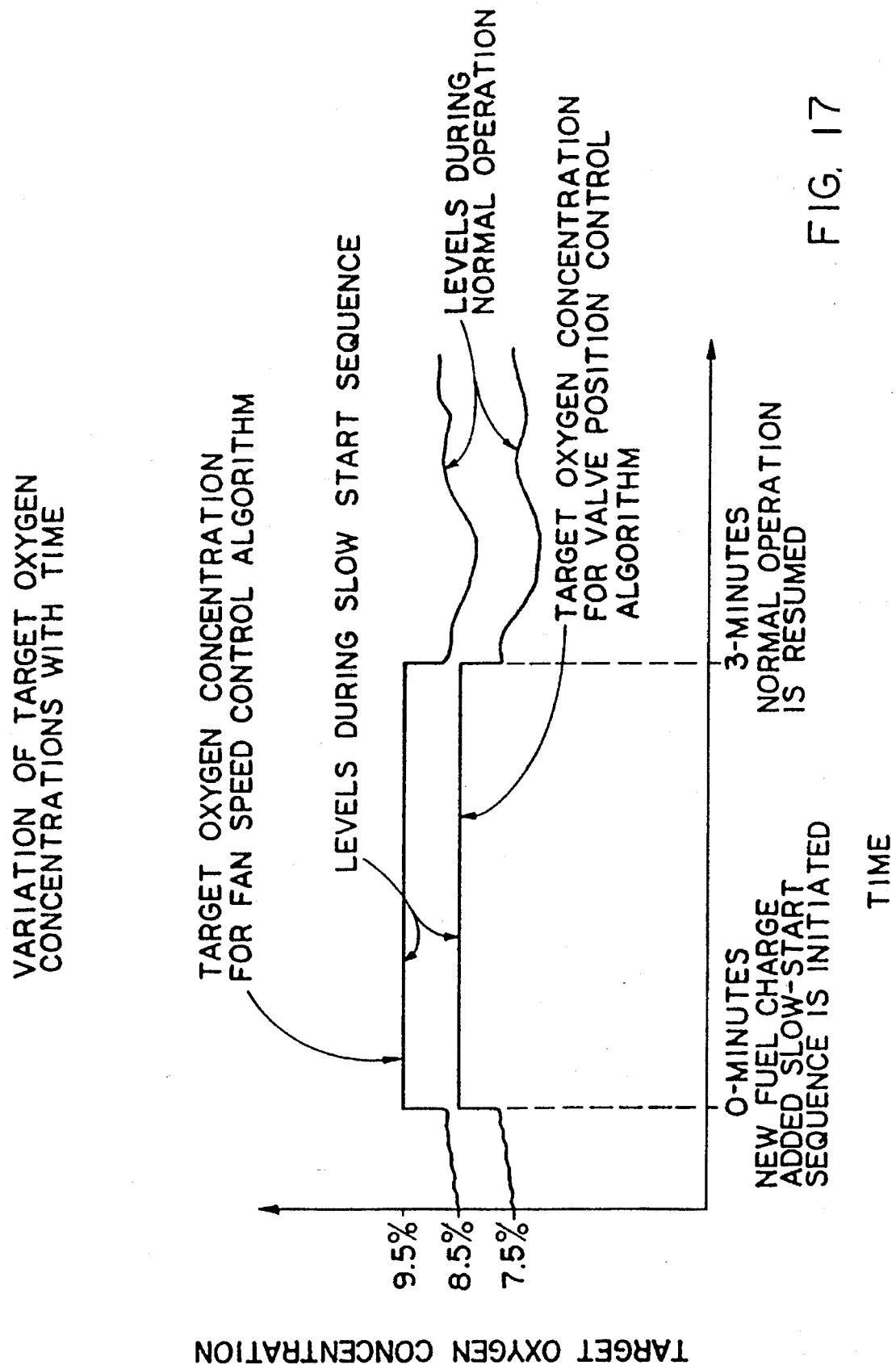
FIG. 17 is a graph of the target oxidation concentrations versus time.
Figure 18:
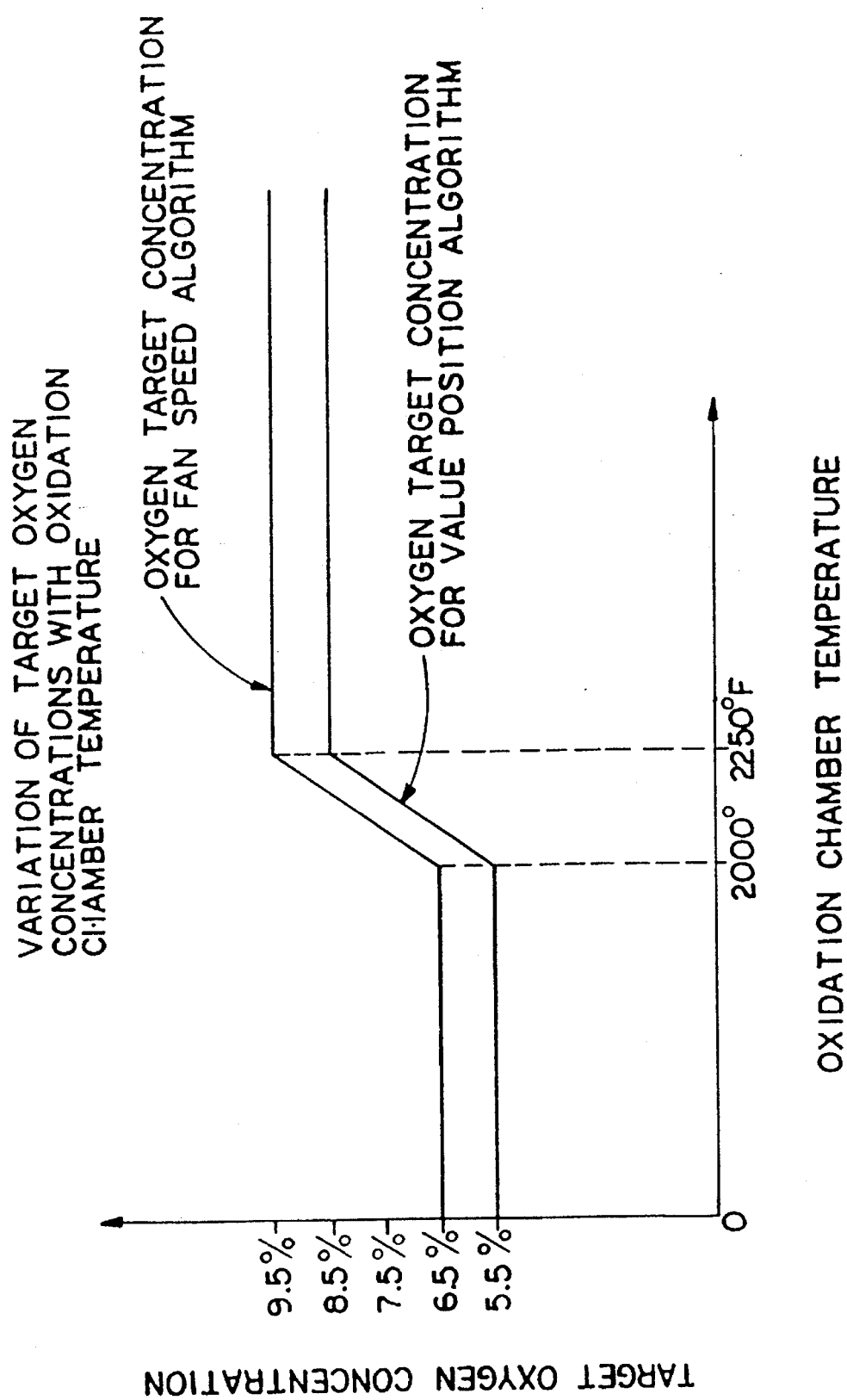
FIG. 18 is a graph of the target oxidation concentrations versus oxidation chamber temperatures.

To maximize the throughput of the apparatus 10, the target oxygen concentration for the induction fan speed algorithm is modified with the change of pyrolysis and oxidation temperatures, as shown in FIGS. 17 and 18. Essentially, the control system 44 encourages a maximum induction fan speed provided the oxidation temperature is at an adequate level. After the apparatus 10 begins processing a new batch of waste material or excessive low energy value or content waste materials are fed into the apparatus 10, the control system 44 will reduce the induction fan speed if it needs to maintain adequate oxidation chamber temperature. If the temperature in the pyrolysis or first chamber 14 drops below a predetermined minimum value, then the control system 44 turns on the heating elements 18 provided that the temperature in the oxidation chamber 16 is adequate. As mentioned earlier, in order to encourage pyrolysis and oxidation of the heavier hydrocarbons in the first chamber 14, the refractory mass 70 forming the base of the pyrolysis chamber 14 is constantly heated by the gases flow through the tunnels therein defining the primary section 16A of the oxidation chamber 16. By heating this area and cooling the top and sides of the pyrolysis chamber 14 with the coolant jacketed vessel 12, pyrolysis and oxidation of the low volatility material is encouraged while runaway gasification of the volatile material is discouraged.

Further, as the material in the pyrolysis chamber 14 is consumed, the control system 44 automatically adds more and more air to the pyrolysis chamber 14 to maintain the hydrocarbon release rate at the optimum level where the oxygen concentration sensed in the discharge gases will be at the desired target until the chamber 14 is provided with 100% of the total intake of air flow rate. This means that at the end of each batch processing cycle, the pyrolysis chamber 14 is, in effect, flooded with oxygen and actually functions as an oxidation chamber to thereby cause substantially complete oxidation of any carbon in the residue material remaining in the first chamber 14 and thus reduction to carbon-free residue ash.

The use of oxygen as the concentration target gas in the discharge gases to provide the means to proportion and regulate primary and secondary air flows is preferred but not essential to the proper functioning of the apparatus 10. The concentrations of other gases such as carbon dioxide, instead of oxygen, could be sensed and measured. Further, although the present invention has been explained and illustrated in association with an induction fan 26 for drawing the air flows through the first and second units 48, 50 of apparatus 10, it should be appreciated by those skilled in the art that the invention is equally applicable to such a thermal process having forced air flows rather than induced.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

We claim:

1. A method of controlling hydrocarbon release rate in thermal processing and converting of materials of widely varying energy content in a batch processing cycle, said hydrocarbon release rate controlling method comprising the steps of:

(a) providing a first chamber capable of receiving successive batches of feed materials for thermal processing and having widely varying energy content;

(b) producing heating in the first chamber to cause pyrolyzing of the feed materials into fluid materials;

(c) providing a second chamber communicating with the first chamber and capable of receiving the fluid materials from the first chamber and communicating the fluid materials to a discharge location;

(d) producing heating in the second chamber to cause oxidizing of the fluid materials into discharge gases reaching the discharge location;

(e) providing a jacketed vessel defining a channel surrounding the first and second chambers containing a flow of coolant fluid through the channel;

(f) producing separate variable flows of primary and secondary air respectively into and through the first and second chambers;

(g) sensing the temperatures in the first and second chambers;

(h) sensing the temperature of the coolant in the channel of the jacketed vessel;

(i) sensing the concentration of a preselected gas in the discharge gases; and (j) in response to the temperatures sensed in the first and second chambers and in the jacketed vessel channel coolant and in response to the concentration of the preselected gas sensed in the discharge gases, controlling primary and secondary flows of air into the first and second chambers so as to proportion and to vary the respective amounts thereof and thereby maintain the concentration of the preselected gas in the discharge gases at a preset target level corresponding with the generation of substantially harmless discharge gases and production of substantially carbon-free residue ash.

2. The method as recited in claim 1, wherein said controlling of the primary and secondary air flows includes:

comparing the sensed concentration of the preselected gas to the preset target level thereof; and changing the proportion of primary air flow to secondary air flow if the sensed concentration of the preselected gas is either higher or lower than the preset target level thereof.

3. The method as recited in claim 2, wherein said changing of the proportion of primary and secondary air flows occurs at a higher rate if the sensed concentration of the preselected gas is lower than the preset target level.

4. The method as recited in claim 2, wherein said changing of the proportion of primary and secondary air flows occurs at a lower rate if the sensed concentration of the preselected gas is higher than the preset target level.

5. The method as recited in claim 1, wherein said controlling of the primary and secondary air flows includes:

comparing the sensed concentration of the preselected gas to the preset target level thereof; and changing the speed of a fan to change the amount of primary and secondary air flows if the sensed concentration of the preselected gas is higher or lower than the preset target level thereof.

6. The method as recited in claim 5, wherein said changing of the speed of the fan occurs at a higher rate if the sensed concentration of the preselected gas is lower than the preset target level thereof.

7. The method as recited in claim 5, wherein said changing of the speed of the fan occurs at a lower rate if the sensed concentration of the preselected gas is higher than the preset target level thereof.

8. The method as recited in claim 1, further comprising:

providing a heated refractory mass having an exterior surface forming the base of the first chamber and exposed to feed materials received therein such that the feed materials in close proximity to said exterior surface are heated and oxidized by said refractory mass.

9. The method as recited in claim 8, wherein said refractory is heated by an arrangement of passages defining at least a portion of the second chamber and communicating with the first chamber such that the refractory mass is surrounded by the jacketed vessel and maintained in a heated condition at an elevated temperature by the heating produced in the first chamber and by the pyrolyzing and oxidizing of materials in the respective first and second chambers, the heated condition of the refractory mass, in turn, causing heating and oxidizing of materials in close proximity to the exterior surface of the refractory mass.

10. The method as recited in claim 1, further comprising:

initiating a slow-start sequence for a predetermined period of time after the receipt of a new batch of material into the first chamber during which the desired target level of concentration of the preselected gas is temporarily increased so that the hydrocarbon release rate is temporarily reduced for the duration of the predetermined period of time.

11. The method as recited in claim 1, further comprising:

ending a batch processing cycle by diverting substantially all air flow into said first chamber to cause oxidation of any feed materials remaining in said first chamber and thereby reduce such materials to substantially carbon-free residue ash.

12. The method as recited in claim 1, wherein the preselected gas is oxygen.

13. A method of controlling hydrocarbon release rate in thermal processing and converting of materials of widely varying energy content in a batch processing cycle, said hydrocarbon release rate controlling method comprising the steps of:

(a) providing a first chamber capable of receiving successive batches of feed materials for thermal processing and having widely varying energy content;

(b) producing heating in the first chamber to cause pyrolyzing of the feed materials into fluid materials;

(c) providing a second chamber communicating with the first chamber and capable of receiving the fluid materials from the first chamber and communicating the fluid materials to a discharge location;

(d) producing heating in the second chamber to cause oxidizing of the fluid materials into discharge gases reaching the discharge location;

(e) providing a jacketed vessel defining a channel surrounding the first and second chambers containing a flow of coolant fluid through the channel;

(f) producing separate variable flows of primary and secondary air respectively into and through the first and second chambers;

(g) sensing the temperatures in the first and second chambers;

(h) sensing the temperature of the coolant in the channel of the jacketed vessel;

(i) sensing the concentration of oxygen in the discharge gases;

(j) providing a heated refractory mass having an exterior surface forming the base of the first chamber and exposed to feed materials received therein such that the feed materials in close proximity to said exterior surface are heated and oxidized by said refractory mass; and (k) in response to the temperatures sensed in the first and second chambers and in the jacketed vessel channel coolant and in response to the concentration of oxygen sensed in the discharge gases, controlling primary and secondary flows of air into the first and second chambers so as to proportion and vary the respective amounts thereof and thereby maintain the concentration of oxygen in the discharge gases at a preset target level corresponding with the generation of substantially harmless discharge gases and production of substantially carbon-free residue ash.

14. The method as recited in claim 13, wherein said controlling of the primary and secondary air flows includes:

comparing the sensed concentration of oxygen to the preset target level thereof; and changing the proportion of primary air flow to secondary air flow if the sensed concentration of oxygen is either higher or lower than the preset target level thereof.

15. The method as recited in claim 14, wherein said changing of the proportion of primary and secondary air flows occurs at a higher rate if the sensed concentration of oxygen is lower than the preset target level.

16. The method as recited in claim 14, wherein said changing of the proportion of primary and secondary air flows occurs at a lower rate if the sensed concentration of oxygen is higher than the preset target level.

17. The method as recited in claim 13, wherein said controlling of the primary and secondary air flows includes:

comparing the sensed concentration of oxygen to the preset target level thereof; and changing the speed of a fan to change the amount of primary and secondary air flows if the sensed concentration of oxygen is higher or lower than the preset target level thereof.

18. The method as recited in claim 17, wherein said changing of the speed of the fan occurs at a higher rate if the sensed concentration of oxygen is lower than the preset target level thereof.

19. The method as recited in claim 17, wherein said changing of the speed of the fan occurs at a lower rate if the sensed concentration of oxygen is higher than the preset target level thereof.

20. The method as recited in claim 13, wherein said refractory mass is heated by an arrangement of passages defining at least a portion of the second chamber and communicating with the first chamber such that the refractory mass is surrounded by the jacketed vessel and maintained in a heated condition at an elevated temperature by the heating produced in the first chamber and by the pyrolyzing and oxidizing of materials in the respective first and second chambers, the heated condition of the refractory mass, in turn, causing heating and oxidizing of materials in close proximity to the exterior surface of the refractory mass.

21. The method as recited in claim 13, further comprising:

initiating a slow-start sequence for a predetermined period of time after the receipt of a new batch of material into the first chamber during which the desired target level of oxygen concentration is temporarily increased so that the hydrocarbon release rate is temporarily reduced for the duration of the predetermined period of time.

22. The method as recited in claim 13, further comprising:

ending a batch processing cycle by diverting substantially all air flow into said first chamber to cause oxidation of any feed materials remaining in said first chamber and thereby reduce such materials to substantially carbon-free residue ash.

* * * * *